(12) United States Patent
Douglas

(10) Patent No.: US 11,285,674 B1
(45) Date of Patent: Mar. 29, 2022

(54) METHOD AND APPARATUS FOR A GEO-REGISTERED 3D VIRTUAL HAND

(71) Applicant: Robert Edwin Douglas, Winter Park, FL (US)

(72) Inventor: Robert Edwin Douglas, Winter Park, FL (US)

(*) Notice: Subject to any disclaimer, the term of this patent is extended or adjusted under 35 U.S.C. 154(b) by 0 days.

(21) Appl. No.: 17/113,062

(22) Filed: Dec. 6, 2020

Related U.S. Application Data

(63) Continuation of application No. 17/075,799, filed on Oct. 21, 2020, and a continuation-in-part of application No. 16/779,658, filed on Feb. 2, 2020, now Pat. No. 10,846,911.

(51) Int. Cl.
*H04N 11/02* (2006.01)
*B29C 64/393* (2017.01)
*G06T 19/20* (2011.01)
*H04N 13/344* (2018.01)
*G06T 19/00* (2011.01)

(52) U.S. Cl.
CPC .......... *B29C 64/393* (2017.08); *G06T 19/006* (2013.01); *G06T 19/20* (2013.01); *H04N 13/344* (2018.05); *G06T 2219/004* (2013.01)

(58) Field of Classification Search
CPC .................................................. B29C 64/393
USPC ........................................................ 700/98
See application file for complete search history.

(56) References Cited

U.S. PATENT DOCUMENTS

| | | | | |
|---|---|---|---|---|
| 5,271,401 | A * | 12/1993 | Fishman | A61B 6/507 424/9.4 |
| 5,412,703 | A * | 5/1995 | Goodenough | G01N 23/046 378/4 |
| 5,535,747 | A * | 7/1996 | Katakura | A61B 8/04 600/438 |
| 6,847,336 | B1 * | 1/2005 | Lemelson | G16H 20/40 345/8 |
| 8,384,771 | B1 * | 2/2013 | Douglas | H04N 13/344 348/53 |
| 9,349,183 | B1 * | 5/2016 | Douglas | H04N 13/275 |
| 9,383,895 | B1 * | 7/2016 | Vinayak | G06F 3/04883 |
| 10,078,377 | B2 * | 9/2018 | Balan | G02B 27/0093 |
| 10,254,546 | B2 * | 4/2019 | Poulos | G06F 3/0304 |
| 10,515,484 | B1 * | 12/2019 | Lucas | G06F 3/017 |
| 2002/0048343 | A1 * | 4/2002 | Launay | A61B 6/504 378/98.12 |
| 2003/0048357 | A1 * | 3/2003 | Kain | G03B 15/006 348/144 |
| 2003/0225513 | A1 * | 12/2003 | Gagvani | G06T 17/05 701/431 |
| 2005/0017972 | A1 * | 1/2005 | Poole | A61B 8/461 345/424 |
| 2005/0168461 | A1 * | 8/2005 | Acosta | G06T 15/08 345/419 |
| 2006/0178580 | A1 * | 8/2006 | Nakamura | G06K 9/00067 600/438 |
| 2006/0181482 | A1 * | 8/2006 | Iaquinto | A61B 90/36 345/8 |

(Continued)

*Primary Examiner* — Leron Beck

(57) ABSTRACT

A 3D virtual hand is generated and is geo-registered to a tangible object. When the tangible object changes in position, so too does the 3D virtual hand. When the tangible object changes in orientation, so too does the 3D virtual hand. The 3D virtual hand is displayed on an extended reality head display unit. Applications include, but are not limited to, teaching music lessons.

15 Claims, 24 Drawing Sheets

PERFORMING GEO-REGISTRATION OF A 3D VIRTUAL HAND ONTO A TANGIBLE OBJECT

(56) References Cited

U.S. PATENT DOCUMENTS

| | | | |
|---|---|---|---|
| 2006/0197837 A1* | 9/2006 | Flath | G06T 7/32 348/143 |
| 2006/0241458 A1* | 10/2006 | Hayashi | A61B 8/06 600/453 |
| 2007/0024612 A1* | 2/2007 | Balfour | G06F 16/954 345/419 |
| 2007/0263915 A1* | 11/2007 | Mashiach | G06K 9/4638 382/130 |
| 2008/0240616 A1* | 10/2008 | Haering | G06T 7/80 382/294 |
| 2009/0321636 A1* | 12/2009 | Ragucci | G01S 19/14 250/330 |
| 2010/0053151 A1* | 3/2010 | Marti | G06F 3/017 345/419 |
| 2010/0081912 A1* | 4/2010 | McKenna | A61B 5/02007 600/368 |
| 2011/0196237 A1* | 8/2011 | Pelissier | A61B 8/467 600/454 |
| 2011/0257561 A1* | 10/2011 | Gertner | A61B 5/4893 601/2 |
| 2011/0316854 A1* | 12/2011 | Vandrovec | G06T 17/20 345/420 |
| 2012/0215096 A1* | 8/2012 | Gilboa | A61B 34/20 600/424 |
| 2013/0095924 A1* | 4/2013 | Geisner | G09B 19/0038 463/32 |
| 2013/0188848 A1* | 7/2013 | Helm | A61B 6/12 382/131 |
| 2013/0230224 A1* | 9/2013 | Claude | A61B 5/055 382/131 |
| 2014/0204002 A1* | 7/2014 | Bennet | G06F 3/04815 345/8 |
| 2014/0307067 A1* | 10/2014 | Douglas | H04N 13/344 348/53 |
| 2015/0379351 A1* | 12/2015 | Dibenedetto | H04N 5/44504 345/633 |
| 2016/0140930 A1* | 5/2016 | Pusch | G02B 27/0172 345/633 |
| 2016/0217612 A1* | 7/2016 | Petill | G06T 3/40 |
| 2017/0140552 A1* | 5/2017 | Woo | G06T 7/73 |
| 2017/0185141 A1* | 6/2017 | Shotton | G06F 3/04815 |
| 2017/0367766 A1* | 12/2017 | Mahfouz | A61B 17/1703 |
| 2018/0047304 A1* | 2/2018 | Sankaran | G16H 50/50 |
| 2018/0116728 A1* | 5/2018 | Lang | A61B 17/1778 |
| 2018/0168730 A1* | 6/2018 | Nazy | G06T 19/003 |
| 2018/0168740 A1* | 6/2018 | Ryan | A61B 34/25 |
| 2018/0315247 A1* | 11/2018 | Van Andel | G06K 9/00342 |
| 2019/0057555 A1* | 2/2019 | Gallop | G06T 15/08 |
| 2020/0333940 A1* | 10/2020 | Lee | G09B 23/28 |
| 2021/0082191 A1* | 3/2021 | Tajik | H04N 21/816 |

* cited by examiner

EXAMPLE GESTURES FOR THE GEO-REGISTERED 3D VIRTUAL HAND

USE OF MULTIPLE 3D VIRTUAL HANDS

DISPLAY OF THE 3D VIRTUAL HAND

Preferred appearance:

Size
- Virtual hand is sized to match the user's hand

Rate of movement
- Moves in a smooth fashion

Other options:

Color
- Variable per user preference (e.g., transparency can be adjusted, color can be adjusted, etc.)

Figure 4

WHAT A USER SEES THROUGH MIXED REALITY HEAD DISPLAY UNIT

GEO-REGISTERED VIRTUAL HAND MATCHES OBJECT POSITION

GEO-REGISTERED VIRTUAL HAND MATCHES OBJECT ORIENTATION

GEO-REGISTERED VIRTUAL HAND MOVES WITH RESPECT TO OBJECT

GEO-REGISTERED VIRTUAL HAND CHANGES ORIENTATION WITH RESPECT TO OBJECT

GEO-REGISTERED VIRTUAL HAND FORMS A NEW GESTURE ON AN OBJECT

ASSIGNING REGISTRATION POINTS AND PROGRAMMED INSTRUCTION SEQUENCE OF A 3D VIRTUAL HAND TO A TANGIBLE OBJECT

Fig. 11A

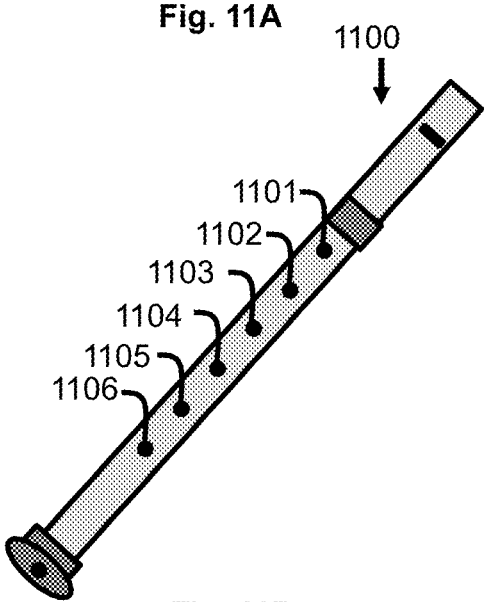

Fig. 11B

| Time point | Registration point and 3D virtual hand gesture | Gesture of 3D virtual hand |
|---|---|---|
| 1 | 3D virtual hand forms a gesture with index finger positioned over registration point 1102 in Figure 11A | |
| 2 | 3D virtual hand forms a gesture with middle finger positioned over registration point 1103 in Figure 11A | |

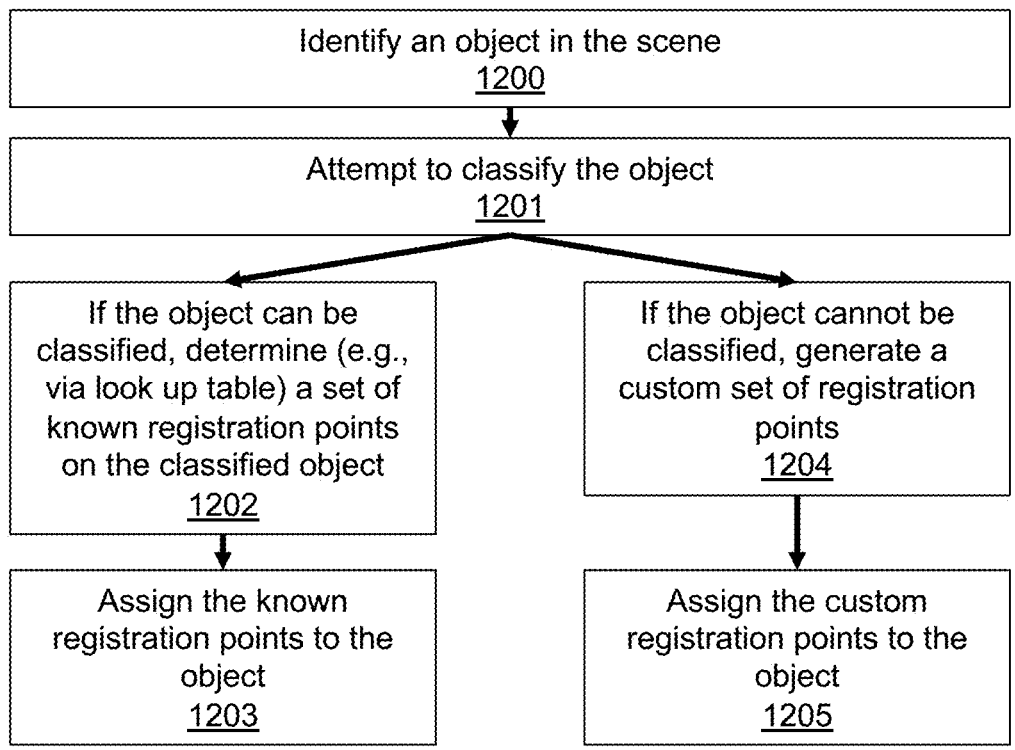

ASSIGNING REGISTRATION POINTS ON AN TANGIBLE OBJECT
Fig. 12A

Identify an object in the scene
1200

Attempt to classify the object
1201

If the object can be classified, determine (e.g., via look up table) a set of known registration points on the classified object
1202

If the object cannot be classified, generate a custom set of registration points
1204

Assign the known registration points to the object
1203

Assign the custom registration points to the object
1205

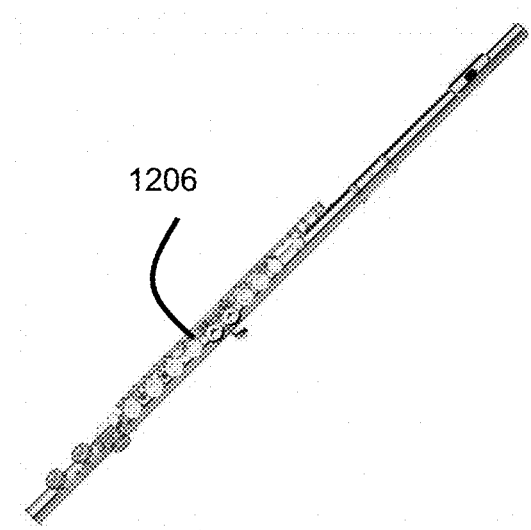

Fig. 12B

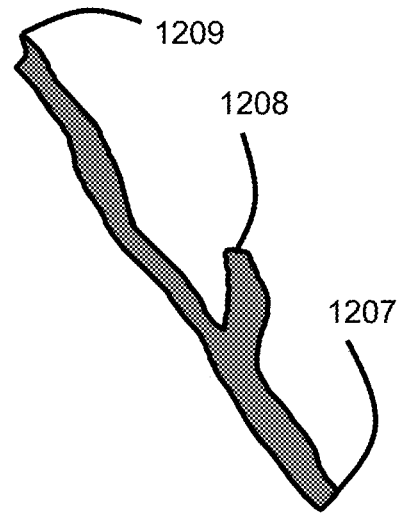

Fig. 12C

GEO-REGISTERED VIRTUAL HAND HOLDS VIRTUAL TOOLS

GENERATING A VIRTUAL OBJECT FROM A TANGIBLE OBJECT

PROVIDING HAPTIC CUES PRIOR TO A PLANNED GESTURE

| Time point | Registration point and 3D virtual hand gesture | Haptic cue delivered via a glove | Visible cue delivered via the 3D virtual hand |
|---|---|---|---|
| 1 | 3D virtual hand forms a gesture with index finger positioned over a hole on a recorder | Vibration at middle finger 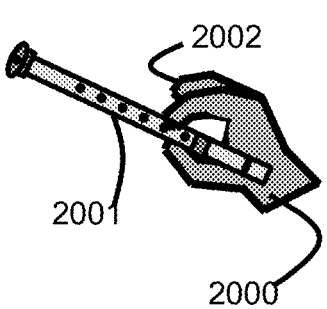 | Visible notification at/on/of middle finger 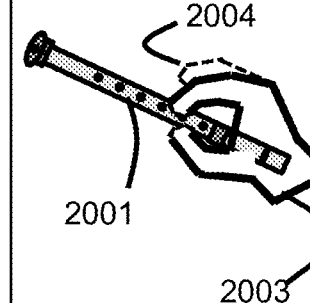 |
| 2 | 3D virtual hand forms a gesture with index finger positioned over different hole on the recorder | Haptic cue at time point 2 is programmed to alert user for upcoming gesture at time point 3 | Visible cue at time point 2 is programmed to alert user for upcoming gesture at time point 3 |

Figure 20

TECHNIQUES TO OPTIMIZE LEARNING A MUSICAL INSTRUMENT

Add in cues
- Visual cues (3D virtual hand, other digital objects) seen on HDU
- Haptic cues (vibration signals) delivered via glove

Add in feedback (to notify if correct or incorrect note)
- Visual feedback (via a sound-type visualization feature)
- Haptic notification

2100

3D VIRTUAL HAND TEACHES NOTES ON A GUITAR

GENERATE A SET OF 3D VIRTUAL OBJECT THROUGH SCENE SENSING CAMERAS

Determine (e.g., by using a scene sensing camera) the 3D shape of a first tangible object (e.g., a human hand of a first user), the 3D shape of a second tangible object (e.g., a classified musical instrument), the relative position of the first tangible object with respect to the second tangible object, and the relative orientation of the first tangible object with respect to the second tangible object at at least one time point 2300

↓

Store the 3D shape of the first tangible object as a first virtual object (e.g., 3D virtual hand gesture), the 3D shape of a second object as a second virtual object (e.g., 3D virtual recorder), the relative position of the first tangible object with respect to the second tangible object, and the relative orientation of the first tangible object with respect to the second tangible object (e.g., with respect to registration points) into a memory (e.g., non-transitory computer readable medium) at the least one time point 2301

↓

Register the at least one time point the second virtual object (e.g., 3D virtual recorder) with a matched tangible object (e.g., tangible recorder) 2302

↓

Register at the least one time point the the first virtual object (e.g., 3D virtual hand) on the matched tangible object (e.g., classified musical recorder) wherein:
- the relative position of the first object with respect to the second object matches the relative position of the first virtual object with respect to the matched tangible object; and
- the relative orientation of the first object with respect to the second object matches the relative orientation of the first virtual object with respect to the matched tangible object 2303

↓

Display the registered first virtual object on the matched tangible object to a user wearing a head display unit at the least one time point 2304

Figure 23

EXAMPLE APPLICATIONS OF THE GEO-REGISTERED 3D VIRTUAL HAND

Medical
- Surgical Procedure
- Interventional Radiology
- Occupational Therapy

Sports
- Golf (e.g., teach how to grip a golf club)

Music
- Guitar (e.g., teach how to play a song)

Machinary
- Tools (e.g., teach how to operate a chain saw)

Art
- Painting (e.g., teach how to paint a Monet replica)

Miscellaneous household
- Table manners (e.g., teach how to properly hold a fork and knife)

Figure 24

METHOD AND APPARATUS FOR A GEO-REGISTERED 3D VIRTUAL HAND

CROSS-REFERENCES TO RELATED APPLICATIONS

This application is a continuation-in-part of U.S. patent application Ser. No. 17/075,799 filed on Oct. 21, 2020, which is a continuation-in-part of U.S. patent application Ser. No. 16/779,658 filed on Feb. 2, 2020.

TECHNICAL FIELD

Aspects of this disclosure are generally related to 3D imaging, and more specifically the integration of geo-registered virtual objects.

BACKGROUND

Standard ways for teaching music are through teachers and books.

SUMMARY

All examples, aspects and features mentioned in this document can be combined in any technically possible way.

This patent provides a method of generating a 3D virtual hand and using it to interact in a geo-registered fashion on tangible object. In the preferred embodiment, a 3D virtual hand is geo-registered to a tangible object wherein the 3D virtual hand has location coordinates in physical space wherein a change in the tangible object's position causes a corresponding change in the 3D virtual hand's position and wherein a change in the tangible object's orientation causes a corresponding change in the 3D virtual hand's orientation. The tangible object's position and orientation are tracked. In addition, some embodiments enable tracking of the tangible object's configuration. The 3D virtual hand's position and orientation are determined. Note that the 3D virtual hand's position and orientation correspond to a change in the tangible object's position and orientation. The 3D virtual hand is displayed on a head display unit (HDU).

Some embodiments comprise wherein the 3D virtual hand forms a first gesture, a first position and a first orientation on the tangible object. Some embodiments comprise wherein the 3D virtual hand performs an unlock step wherein the unlock step comprises allowing 3D virtual hand to move independently from the tangible object. Some embodiments comprise wherein the 3D virtual hand forms a second gesture, a second position and a second orientation on the tangible object.

Some embodiments comprise wherein the tangible object is a musical instrument. Some embodiments comprise wherein the 3D virtual hand teaches a note by performing at least one of the group consisting of: performing a gesture on the musical instrument; moving in position on the musical instrument; and altering in orientation on the musical instrument. Some embodiments comprise displaying a sound-type visualization feature, which is disclosed in U.S. Pat. No. 10,846,911, 3D IMAGING OF VIRTUAL FLUIDS AND VIRTUAL SOUNDS, which is incorporated by reference in its entirety. Some embodiments comprise wherein the 3D virtual hand maintains a gesture until a human hand matches the gesture. Some embodiments comprise further comprising generating a set of registration points on the tangible object. Some embodiments comprise wherein a 3D virtual hand forms a gesture by performing at least one of the group consisting of: flexing at least one finger; extending at least one finger; adducting at least one finger; and abducting at least one finger. This is useful to improve music lessons.

Some embodiments comprise classifying a second tangible object in the scene using an artificial intelligence algorithm; and assigning registration points to the second tangible object.

Some embodiments comprise generating a sequence of gestures for the 3D virtual hand on the tangible object wherein the set of registration points are used to determine a set of movements of the 3D virtual hand.

Some embodiments comprise using a camera to determine a shape, a size and an appearance of a second tangible object in the scene; and generating a 3D virtual object based on the second tangible object. For example, a scene sensing camera can classify an object in the room as a Budwiser beer bottle. A 3D virtual object can be inserted into the scene to match the Budwiser beer bottle.

Some embodiments comprise performing geo-registration of a 3D virtual object to the 3D virtual hand wherein the 3D virtual object has location coordinates in physical space wherein a change in the second 3D virtual hand's position causes a corresponding change in the 3D virtual object's position and wherein a change in the virtual hand's orientation causes a corresponding change in the 3D virtual object's orientation.

Some embodiments comprise performing geo-registration of a 3D virtual object to a human hand wherein a change in the human hand's position causes a corresponding change in the 3D virtual object's position and wherein a change in the human hand's orientation causes a corresponding change in the 3D virtual object's orientation.

Some embodiments comprise wherein the 3D virtual hand changes in appearance to get a user's attention. Some embodiments comprise providing a visual cue for a subsequent planned gesture on the HDU. Some embodiments comprise providing a haptic cue for a subsequent planned gesture via a glove.

Some embodiments comprise using a non-transitory computer storage medium having computer-executable instructions which, when executed by a computing device, cause the computing device to perform the operations of: performing geo-registration of a 3D virtual hand to a tangible object wherein the 3D virtual hand has location coordinates in physical space wherein a change in the tangible object's position causes a corresponding change in the 3D virtual hand's position and wherein a change in the tangible object's orientation causes a corresponding change in the 3D virtual hand's orientation; tracking the tangible object's position and orientation; determining a change in the 3D virtual hand's position and orientation, which correspond to a change in the tangible object's position and orientation; and displaying the 3D virtual hand in a head display unit (HDU).

Some embodiments comprise a display unit, comprising: a processor; a left eye display; a right eye display; a non-transitory memory having computer-executable instructions stored thereupon, which when executed by the processor cause the display unit to perform the operations of: performing geo-registration of a 3D virtual hand to a tangible object wherein the 3D virtual hand has location coordinates in physical space wherein a change in the tangible object's position causes a corresponding change in the 3D virtual hand's position and wherein a change in the tangible object's orientation causes a corresponding change in the 3D virtual hand's orientation; tracking the tangible object's position and orientation; determining a change in the 3D virtual hand's position and orientation, which correspond to a change in the tangible object's position and orientation; and displaying the 3D virtual hand on the display unit.

Some embodiments comprise utilizing eye tracking. For example, when a user's eyes are determined by an eye tracking to be looking away from the 3D virtual hand, which is further disclosed in U.S. patent application Ser. No. 16/842,631, A SMART SCROLLING SYSTEM, which is incorporated by reference in its entirety.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides steps explained herein that when performed (e.g. when executing) on the processor, operates as explained herein within the computerized device to perform all of the method embodiments and operations explained herein as embodiments of the invention. Thus any computerized device that performs or is programmed to perform processing explained herein is an embodiment of the invention.

Other arrangements of embodiments of the invention that are disclosed herein include Software programs to perform the method embodiment steps and operations Summarized above and disclosed in detail below. More particularly, a computer program product is one embodiment that has a computer-readable medium including computer program logic encoded thereon that when performed in a computerized device provides associated operations providing steps as explained herein.

The computer program logic, when executed on at least one processor with a computing system, causes the processor to perform the operations (e.g., the methods) indicated herein as embodiments of the invention. Such arrangements of the invention are typically provided as Software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other Such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as Software and hardware, or as hardware and/or circuitry alone. Such as within a data communications device. The features of the invention, as explained herein, may be employed in data processing devices and/or Software systems for Such devices. Note that each of the different features, techniques, configurations, etc. discussed in this disclosure can be executed independently or in combination. Accordingly, the present invention can be embodied and viewed in many different ways. Also, note that this Summary section herein does not specify every embodiment and/or incrementally novel aspect of the present disclosure or claimed invention. Instead, this Summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE FIGURES

The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables, are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 4 illustrates preferred appearance for the display of the 3D virtual hand.

FIG. 11A illustrates assigning registration points to a tangible object.

FIG. 11B illustrates an example of a pre-programmed sequence for the 3D virtual hand to move on the tangible object.

FIG. 12A illustrates the method for assigning registration points on a classified tangible object.

FIG. 12B illustrates an example of a classified object.

FIG. 12C illustrates an example of an unclassifeid object.

FIG. 20 illustrates the delivery of the haptic cue and the visible cue to a user.

FIG. 23 illustrates generating a set of 3D virtual objects through scene sensing cameras.

FIG. 24 illustrates example applications of the geo-registered 3D virtual hand.

DETAILED DESCRIPTION

Some aspects, features and implementations described herein may include machines such as computers, electronic components, optical components, and processes such as computer-implemented steps. It will be apparent to those of ordinary skill in the art that the computer-implemented steps may be stored as computer-executable instructions on a non-transitory computer-readable medium. Furthermore, it will be understood by those of ordinary skill in the art that the computer-executable instructions may be executed on a variety of tangible processor devices. For ease of exposition, not every step, device or component that may be part of a computer or data storage system is described herein. Those of ordinary skill in the art will recognize such steps, devices and components in view of the teachings of the present disclosure and the knowledge generally available to those of ordinary skill in the art. The corresponding machines and processes are therefore enabled and within the scope of the disclosure.

Figure 1:
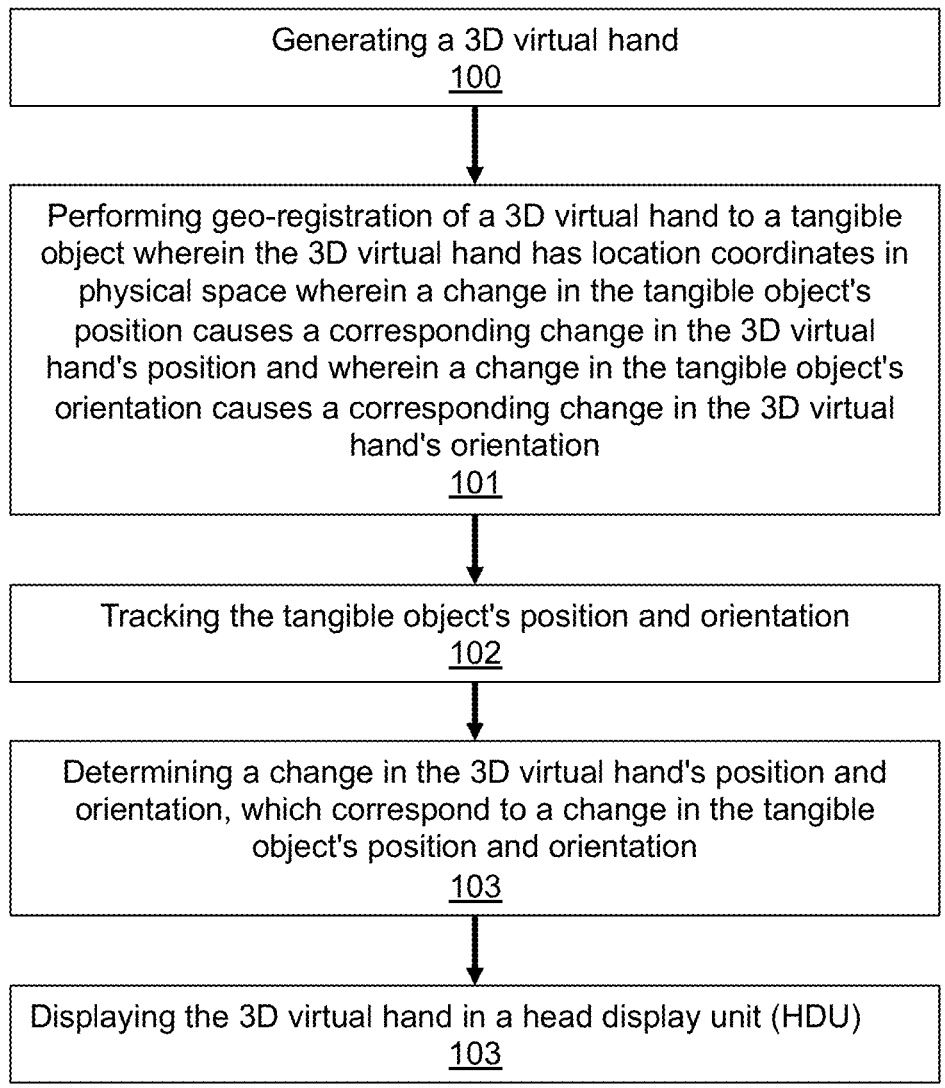
FIG. 1 illustrates performing geo-registration of a 3D virtual hand on a tangible object.

FIG. 1 illustrates performing geo-registration of a 3D virtual hand on a tangible object. Processing block 100 illustrates generating a 3D virtual hand. Processing block 101 illustrates performing geo-registration of a 3D virtual hand to a tangible object wherein the 3D virtual hand has location coordinates in physical space wherein a change in the tangible object's position causes a corresponding change in the 3D virtual hand's position and wherein a change in the tangible object's orientation causes a corresponding change in the 3D virtual hand's orientation. Geo-registration is taught in U.S. Pat. No. 10,712,837, USING GEO-REGISTERED TOOLS TO MANIPULATE THREE-DIMENSIONAL MEDICAL IMAGES, which is incorporated by reference in its entirety. Processing block 102 illustrates tracking the tangible object's position and orientation. Processing block 103 illustrates determining a change in the 3D virtual hand's position and orientation, which correspond to a change in the tangible object's position and orientation. Processing block 104 illustrates displaying the 3D virtual hand in the head display unit.

Figure 2A:
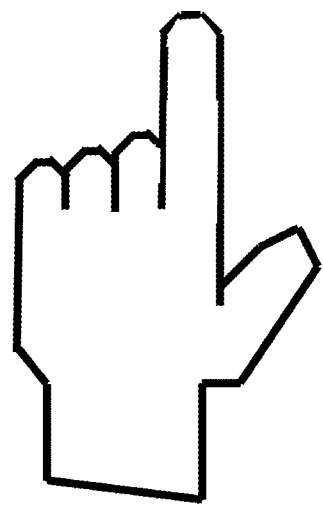
FIG. 2A illustrates a first gesture of a 3D virtual hand.

FIG. 2A illustrates a first gesture of a 3D virtual hand. Note that the 3D virtual hand is viewes from the back. Note that the index finger is extended. Note that the middle finger, ring finger and small finger are flexed. Note that the index finger is in the adducted position.

Figure 2B:
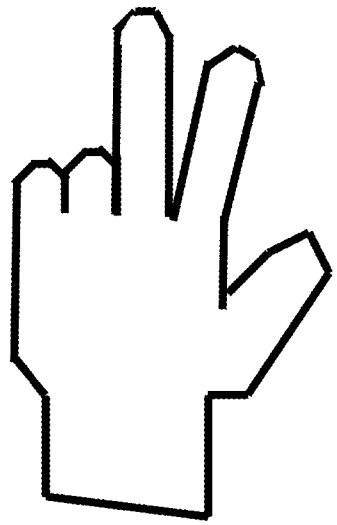
FIG. 2B illustrates a second gesture of a 3D virtual hand.

FIG. 2B illustrates a second gesture of a 3D virtual hand. Note that the 3D virtual hand is viewes from the back. Note that both the index finger and ring finger are extended. Note that the ring finger and the little finger are flexed. Also note that the middle finger and index finger are splayed apart via abduction of the index finger.

Figure 2C:
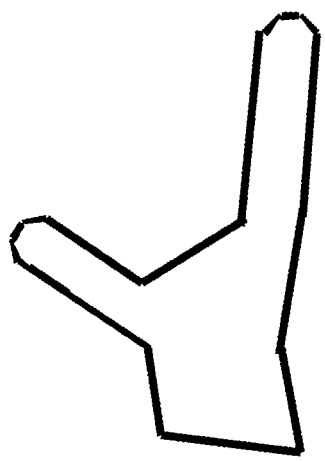
FIG. 2C illustrates a third gesture of a 3D virtual hand.

FIG. 2C illustrates a third gesture of a 3D virtual hand. Note the the 3D virtual hand is visualized from the side. Note that all fingers are extended. Note that the 3D virtual hand forms an "L" shape.

Figure 2D:
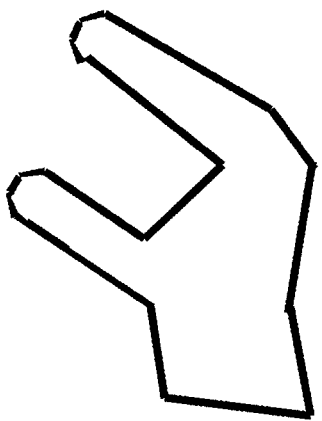
FIG. 2D illustrates a fourth gesture of a 3D virtual hand.

FIG. 2D illustrates a fourth gesture of a 3D virtual hand. Note that the 3D virtual hand is visualized from the side. Note that all fingers are mid-way between an extended position and a flexed position. Note that the 3D virtual hand forms a "U" shape.

Figure 3:
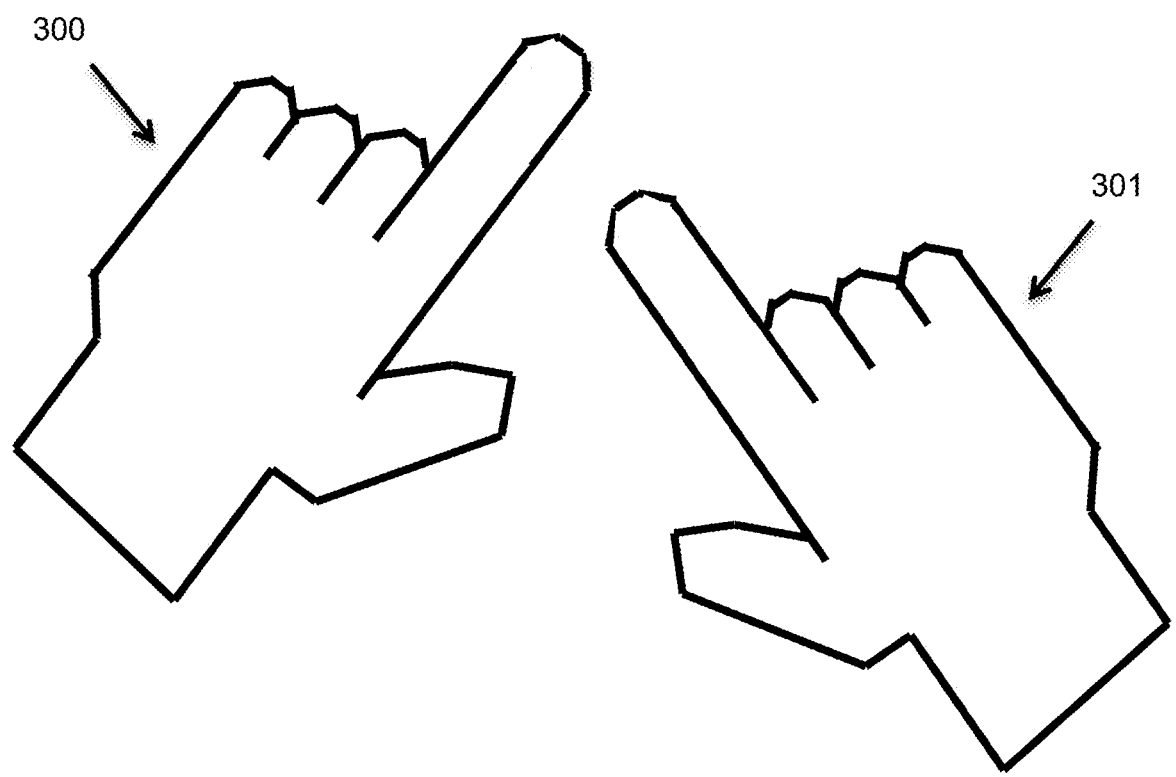
FIG. 3 illustrates the user of multiple 3D virtual hands.

FIG. 3 illustrates the user of multiple 3D virtual hands. A first 3D virtual hand 300 is shown, which is a left hand. A second 3D virtual hand 301 is shown, which corresponds to a right hand. The use of two virtual hands is beneficial in teaching and performing two-handed activities. For example, a golf club is held with two hands. A steering wheel is help with two hands. Art and music activities are also commonly performed with two hands.

FIG. 4 illustrates preferred appearance for the display of the 3D virtual hand. In the preferred embodiment, the size of the 3D virtual hand would match that of a user's hand. In the preferred embodiment, the rate of movement would be smooth so a user could watch the 3D virtual hand and learn.

Other options include color options, which can be user selected. Additionally, the 3D virtual hand can vary in transparency.

Figure 5:
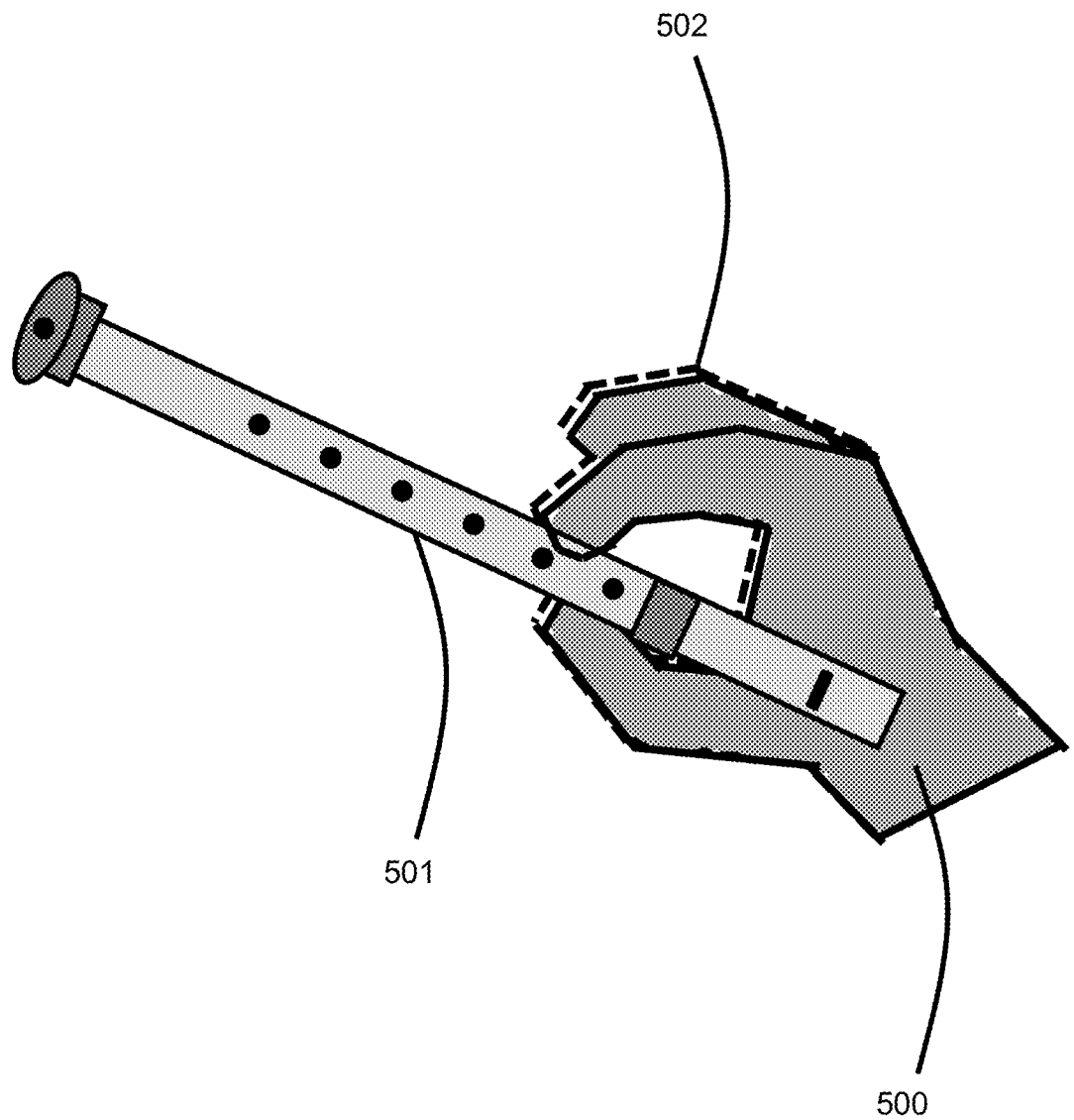
FIG. 5 illustrates what a user sees when looking through mixed reality head display unit wherein a human hand is in good position.

FIG. 5 illustrates what a user sees when looking through mixed reality head display unit wherein a human hand is in good position. 500 illustrates the human hand, which may or may not be inside of a glove. 501 illustrates the musical instrument, which in this case is a recorder. 502 illustrates a 3D virtual hand. Note that the human hand and the 3D virtual hand are in similar positions. Also note that the outline of the 3D virtual hand is shown, which enables the user to see the human hand clearly when looking through a mixed reality or augmented reality head display unit.

Figure 6A:
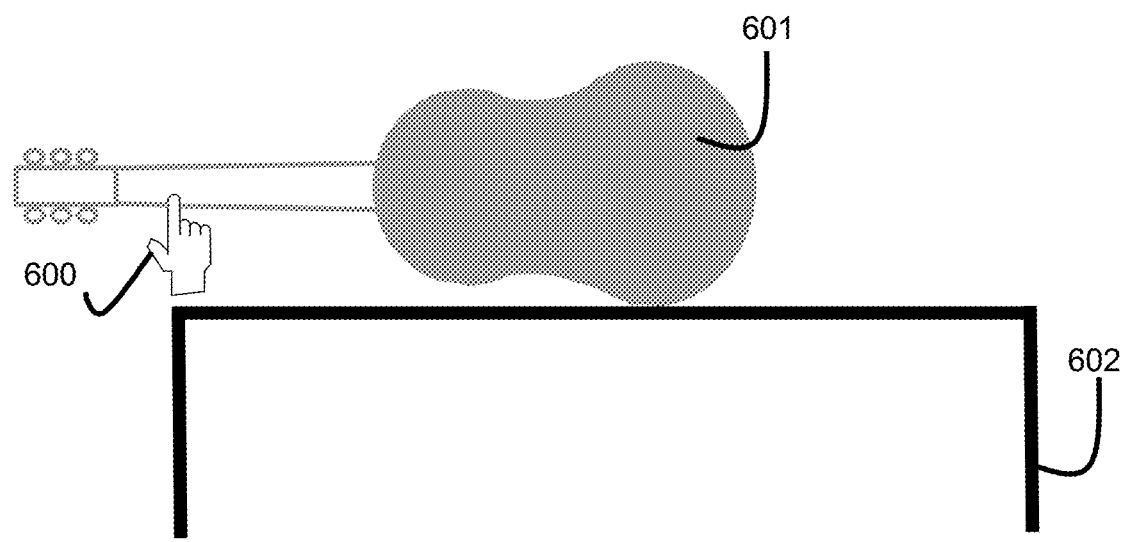
FIG. 6A illustrates a 3D virtual hand, which is geo-registered to a first tangible object, wherein the first tangible object is located at a first location on a second tangible object.

FIG. 6A illustrates a 3D virtual hand, which is geo-registered to a first tangible object, wherein the first tangible object is located at a first location on a second tangible object. 600 illustrates the 3D virtual hand. 601 illustrates the first tangible object, which in this example is a guitar. 602 illustrates the second tangible object, which in this example is a table. Note the position of the 3D virtual hand 600, which is geo-registered to the first tangible object. Note that the 3D virtual hand 600 forms a first gesture. Note the first location of the first tangible object 601 on the second tangible object 602.

Figure 6B:
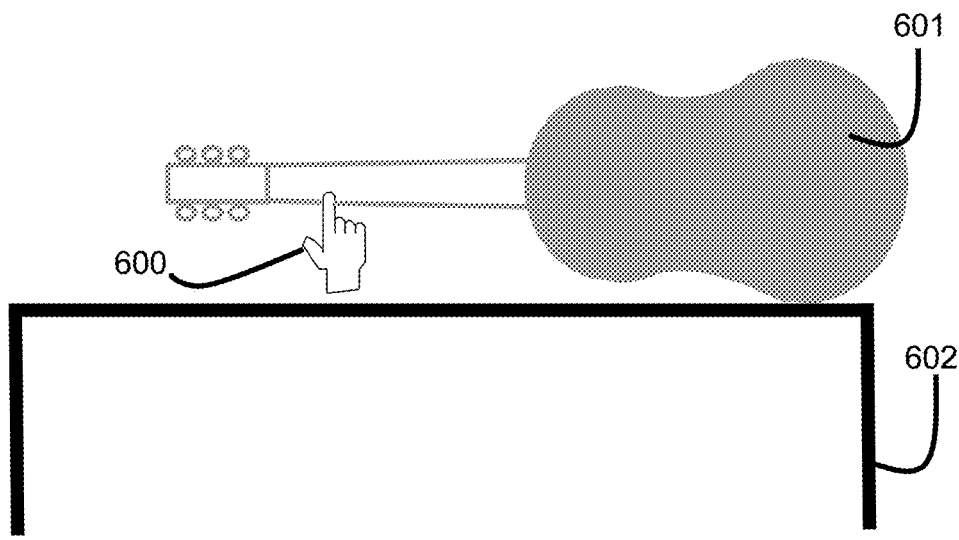
FIG. 6B illustrates the 3D virtual hand, which is geo-registered to the first tangible object, wherein the first tangible object is located at a second location on the second tangible object.

FIG. 6B illustrates the 3D virtual hand, which is geo-registered to the first tangible object, wherein the first tangible object is located at a second location on the second tangible object. 600 illustrates the 3D virtual hand. 601 illustrates the first tangible object, which in this example is a guitar. 602 illustrates the second tangible object, which in this example is a table. Note the position of the 3D virtual hand 600, which is geo-registered to the first tangible object. Note that the 3D virtual hand 600 is still forming the first gesture. Note that the 3D virtual hand 600 has not moved with respect to the first tangible object. Note the second location of the first tangible object 601 on the second tangible object 602. The first tangible object 601 has been shifted from the center of the second tangible object 602 to the side of the second tangible object 602.

Figure 7A:
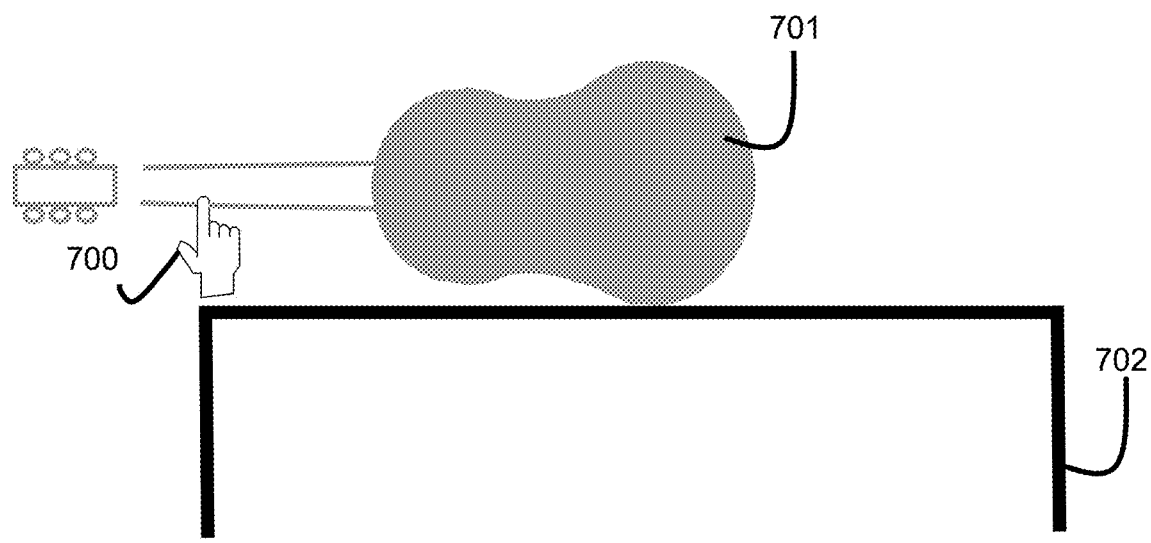
FIG. 7A illustrates a 3D virtual hand, which is geo-registered to a first tangible object, wherein the first tangible object has a first orientation.

FIG. 7A illustrates a 3D virtual hand, which is geo-registered to a first tangible object, wherein the first tangible object has a first orientation. 700 illustrates the 3D virtual hand. 701 illustrates the first tangible object, which in this example is a guitar. 702 illustrates the second tangible object, which in this example is a table. Note the position and orientation of the 3D virtual hand 700 with respect to the first tangible object 701. Note that the 3D virtual hand 700 forms a first gesture. Note the first orientation of the first tangible object 701 with respect to the second tangible object.

Figure 7B:
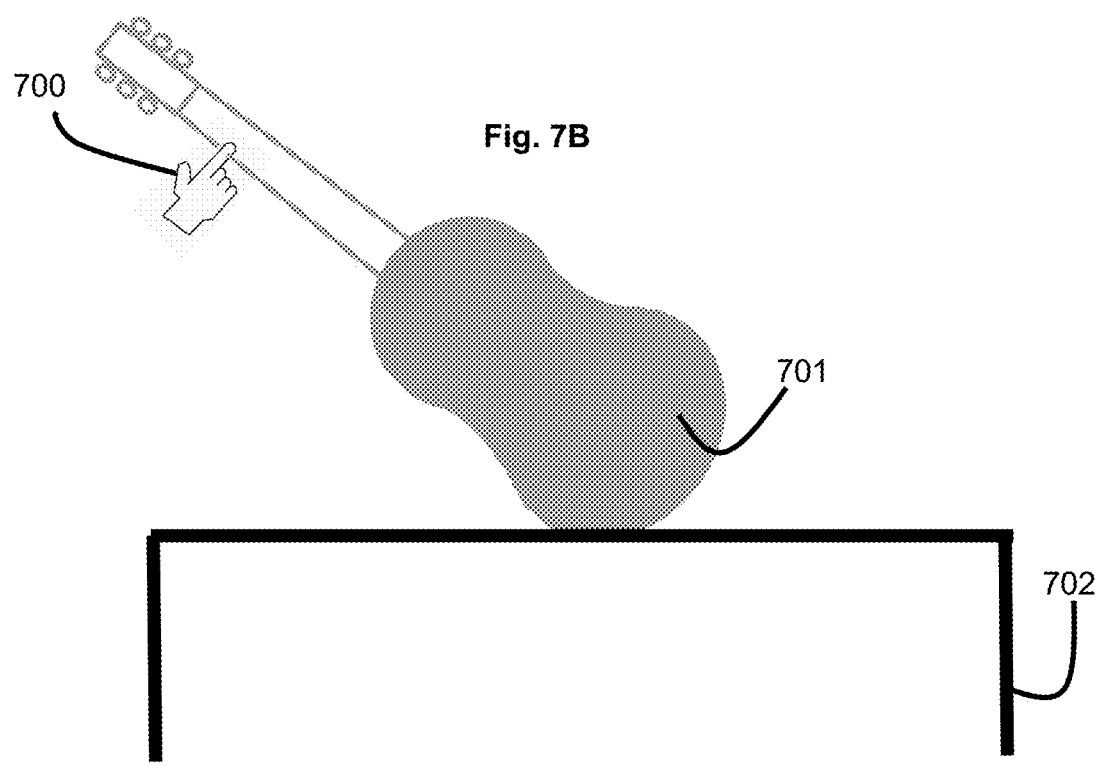
FIG. 7B illustrates the 3D virtual hand, which is geo-registered to the first tangible object, wherein the first tangible object has a second orientation.

FIG. 7B illustrates the 3D virtual hand, which is geo-registered to the first tangible object, wherein the first tangible object has a second orientation. 700 illustrates the 3D virtual hand. 701 illustrates the first tangible object, which in this example is a guitar. Note that the orientation of the first tangible object 701 has changed, as compared to FIG. 7B. Note that the orientation and position of the 3D virtual hand remains fixed relative to the first tangible object 701. 702 illustrates the second tangible object, which in this example is a table.

Figure 8A:
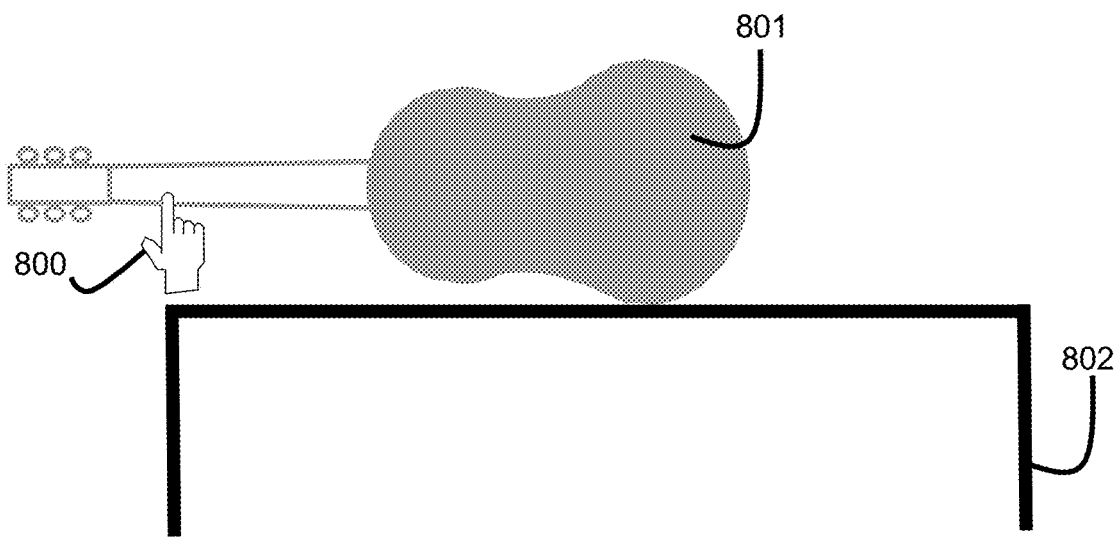
FIG. 8A illustrates a 3D virtual hand, which is geo-registered to a first tangible object, wherein the 3D virtual hand has a first location on the first tangible object.

FIG. 8A illustrates a 3D virtual hand, which is geo-registered to a first tangible object, wherein the 3D virtual hand has a first location on the first tangible object. 800 illustrates the 3D virtual hand. 801 illustrates the first tangible object, which in this example is a guitar. 102 illustrates the second tangible object, which in this example is a table. Note the first position of the 3D virtual hand 800 with respect to the first tangible object 801, which is near the headstock of the guitar.

Figure 8B:
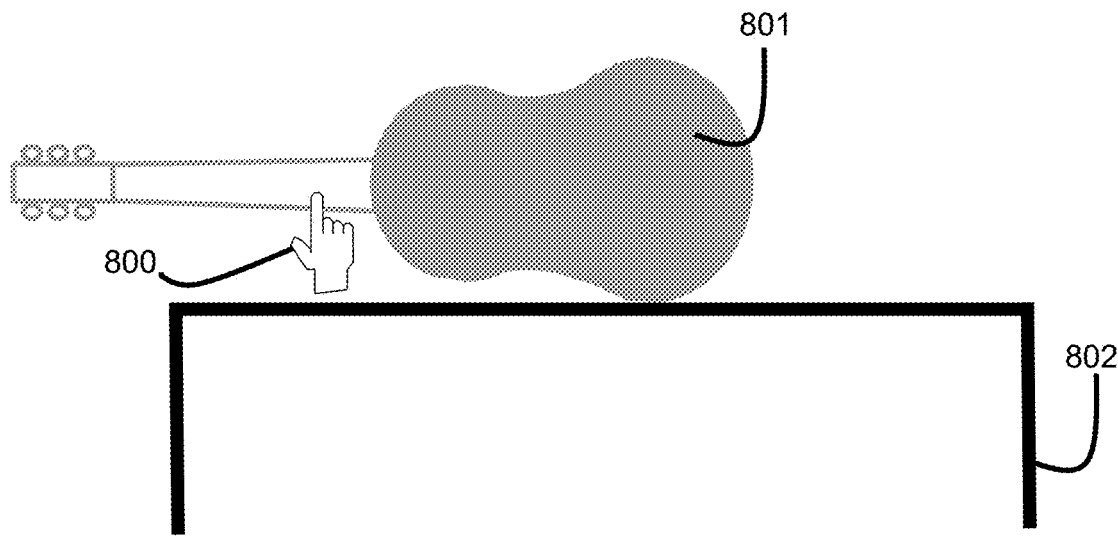
FIG. 8B illustrates the 3D virtual hand, which is geo-registered to the first tangible object, wherein the 3D virtual hand has a second location on the first tangible object.

FIG. 8B illustrates the 3D virtual hand, which is geo-registered to the first tangible object, wherein the 3D virtual hand has a second location on the first tangible object. 800 illustrates the 3D virtual hand. 801 illustrates the first tangible object, which in this example is a guitar. 802 illustrates the second tangible object, which in this example is a table. Note the first position of the 3D virtual hand 800 with respect to the first tangible object 801, which is near the body of the guitar. Note that a program is utilized to control the timing and location of the movements of the 3D virtual hand 800 with respect to the first tangible object 801. An example task would be to provide a music lesson to a student.

Figure 9A:
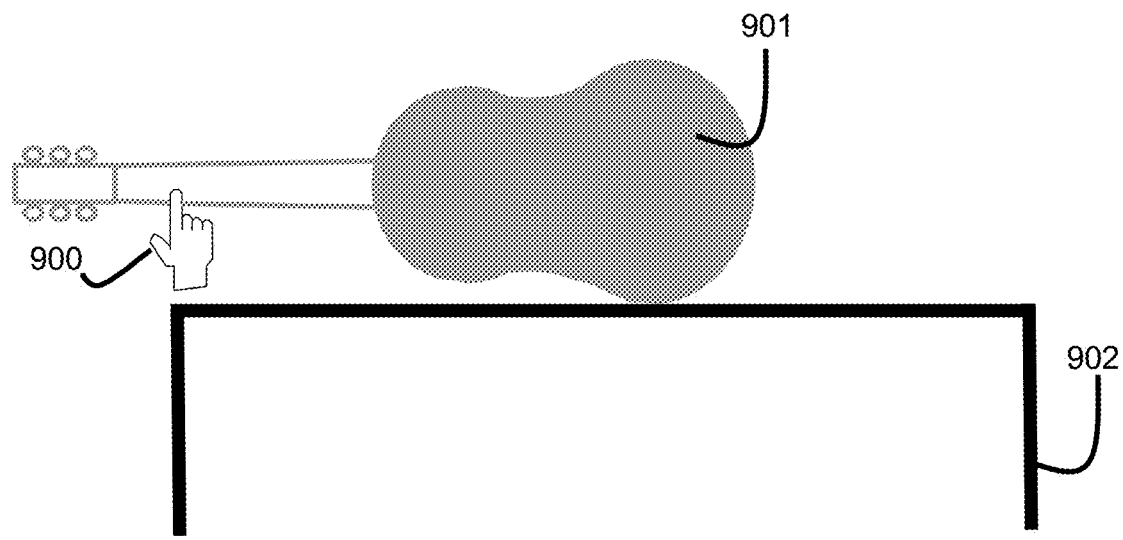
FIG. 9A illustrates a 3D virtual hand, which is geo-registered to a first tangible object, wherein the 3D virtual hand has a first orientation with respect to the first tangible object.

FIG. 9A illustrates a 3D virtual hand, which is geo-registered to a first tangible object, wherein the 3D virtual hand has a first orientation with respect to the first tangible object. 900 illustrates the 3D virtual hand. 901 illustrates the first tangible object, which in this example is a guitar. 902 illustrates the second tangible object, which in this example is a table. Note the first orientation of the 3D virtual hand 900 with respect to the first tangible object 901, which has the index finger oriented perpendicular to the neck of the first tangible object 901.

Figure 9B:
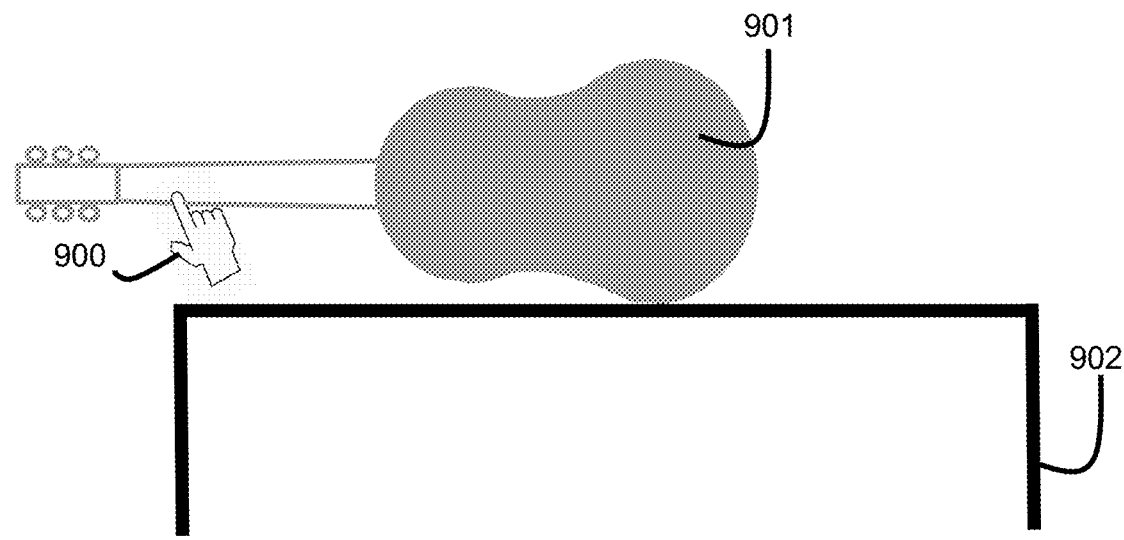
FIG. 9B illustrates the 3D virtual hand, which is geo-registered to the first tangible object, wherein the 3D virtual hand has a second orientation with respect to the first tangible object.

FIG. 9B illustrates the 3D virtual hand, which is geo-registered to the first tangible object, wherein the 3D virtual hand has a second orientation with respect to the first tangible object. 900 illustrates the 3D virtual hand. 901 illustrates the first tangible object, which in this example is a guitar. 902 illustrates the second tangible object, which in this example is a table. Note the second orientation of the 3D virtual hand 900 with respect to the first tangible object 901, which has the index finger oriented at approximately a 30 degree angle with respect to the neck of the first tangible object 901. Note that a program is utilized to control the timing and location of the movements of the 3D virtual hand 100 with respect to the first tangible object 901. An example task would be to provide a music lesson to a student.

Figure 10A:
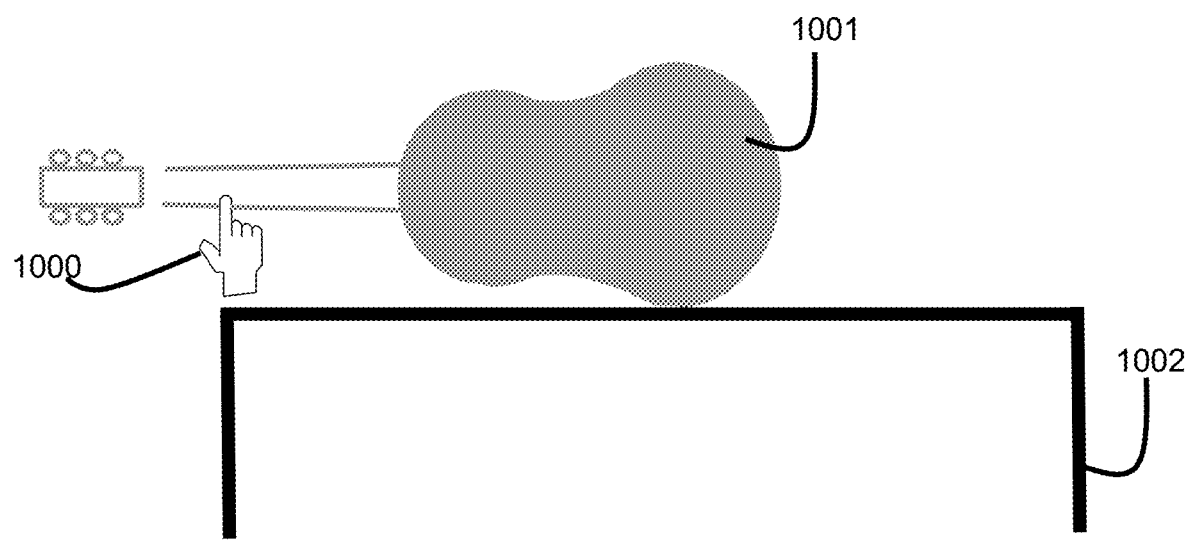
FIG. 10A illustrates a 3D virtual hand, which is geo-registered to a first tangible object, wherein the 3D virtual hand has a first gesture.

FIG. 10A illustrates a 3D virtual hand, which is geo-registered to a first tangible object, wherein the 3D virtual hand has a first gesture. 1000 illustrates the 3D virtual hand. 1001 illustrates the first tangible object, which in this example is a guitar. 1002 illustrates the second tangible object, which in this example is a table. Note the first gesture of the 3D virtual hand 1001, which is comprised of the index finger of the 3D virtual hand 100 being extended and the middle finger, ring finger and little finger of the 3D virtual hand 1001 being flexed.

Figure 10B:
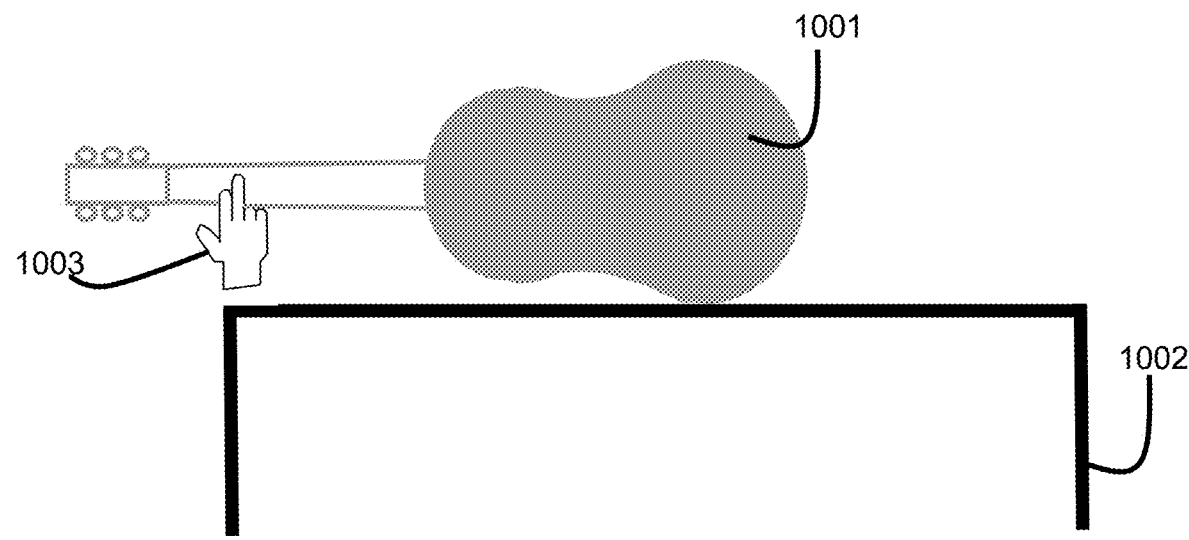
FIG. 10B illustrates the 3D virtual hand, which is geo-registered to the first tangible object, wherein the 3D virtual hand has a second gesture.

FIG. 10B illustrates the 3D virtual hand, which is geo-registered to the first tangible object, wherein the 3D virtual hand has a second gesture. 1000 illustrates the 3D virtual hand. 1001 illustrates the first tangible object, which in this example is a guitar. 1002 illustrates the second tangible object, which in this example is a table. Note the second gesture of the 3D virtual hand 1003, which is comprised of the index finger of the 3D virtual hand 1003 being partially extended, the middle finger of the 3D virtual hand 1003 being extended and the ring finger and little finger of the 3D virtual hand 1003 being flexed.

FIG. 11A illustrates assigning registration points to a tangible object. A finger of the 3D virtual object is placed onto a particular spot on the tangible object. 1100 illustrates a tangible object, which in this example is a recorder musical instrument. 1101 illustrates a first hole on the tangible object 1100, which serves as a first registration point on the tangible object. 1102 illustrates a second hole on the tangible object 1100, which serves as a second registration point on the tangible object. 1103 illustrates a third hole on the tangible object 1100, which serves as a third registration point on the tangible object. 1104 illustrates a fourth hole on the tangible object 1100, which serves as a fourth registration point on the tangible object. 1105 illustrates a fifth hole on the tangible object 1100, which serves as a fifth registration point on the tangible object. 1106 illustrates a sixth hole on the tangible object 1100, which serves as a sixth registration point on the tangible object. In some embodiments, registration points are spread out over the surface of the tangible object.

FIG. 11B illustrates an example of a pre-programmed sequence for the 3D virtual hand to move on the tangible object. At the first time point, the 3D virtual hand forms a gesture where the index finger is placed over registration point 1102 in FIG. 11A. At the second time point, the 3D virtual hand forms a gesture where the middle finger is placed over registration point 1103 in FIG. 11A. Note is made that these sequences can be programmed in accordance with the songs. The timing can be adjusted at standard song rate, faster or slower. Some musical instruments have various styles of gestures or two or more reasonable gestures to play a note. These too can be programmed.

FIG. 12A illustrates the method for assigning registration points on a classified tangible object. Processing block 1200 illustrates identifying an object in the scene. For example, a mixed reality headset with a scene sensing camera views the scene and identifies an object in the scene. At this stage, the object is identified. Processing block 1201 illustrates classifying an object in the scene. For example, the scene sensing camera gathers information on the visual appearance of the surface of the object and the 3D geometry of the surface of the object. The most effective method to classify would be through artificial intelligence algorithms, such as neural networks. This is described further in U.S. patent application Ser. No. 16/939,192 filed on Jul. 27, 2020, which is incorporated by reference in its entirety. For example, the object is classified as a Gemeinhardt 2sp Student Flute. Other examples include, but are not limited to, the following: golfclub; piano; guitar; scalpel; wrench, hammer; phone; and, steering wheel. Processing block 1202 illustrates if the object can be classified, determining (e.g., via look up table) a set of known registration points on the classified object. A table of objects with associated registration points can be generated. For example, the table can include musical instruments, such as the Gemeinhardt 2sp Student Flute. The Gemeinhardt 2sp Student Flute has a precise, known geometry. Registration points would, in this example, be assigned to locations on the Gemeinhardt 2sp Student Flute where a user would move their hands to play a note. Processing block 1203 illustrates assigning the known registration points to the object. For example, locations on the Gemeinhardt 2sp Student Flute can be assigned as registration points. This is useful for programming the sequence of the 3D virtual hand (which is geo-registered to the Gemeinhardt 2sp Student Flute) so that the 3D virtual hand moves to precise locations on the Gemeinhardt 2sp Student Flute. This example was of a rigid object; however, a similar process can be performed for non-rigid objects as well. Processing block 1204 illustrates if the object cannot be classified, generating a custom set of registration points. For example, a stick found in the woods could be the object in this scenario. For objects such as the stick found in the woods, a custom set of registration points can be assigned. For example, the tips at each end can be registration points. Registration points can also be placed at the midpoint.

FIG. 12B illustrates an example of a classified object. 1206 illustrates a registration point, which is a key on the Gemeinhardt 2sp Student Flute. Note that several registration points will be performed on the tangible object.

FIG. 12C illustrates an example of an unclassifeid object. In this example, a stick found in the woods is shown. This example algorithm generates a registration point at every end of the stick. 1207 illustrates a first end. 1208 illustrates a second end. 1209 illustrates a third end. Some algorithms can help via the 3D virtual hand where to hold certain unclassified objects. For example, it could alert the user where it is easiest to hold the stick (where the most mechanical advantage can be obtained), where the sturdiest portion of the stick is located, if there are any dangerous spots (e.g., sharp) on the stick. Thus, an unknown object can be configured with registration points.

Figure 13A:
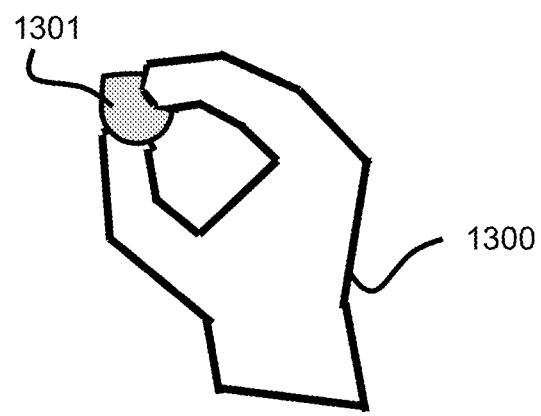
FIG. 13A illustrates a virtual hand holding a first virtual object.

FIG. 13A illustrates a virtual hand holding a first virtual object. 1300 illustrates a 3D virtual hand. 1301 illustrates a first virtual object, which is a virtual guitar pick. This technology is useful because it improves teaching strategies. Rather than a user reading a book and mimicking a hand gesture in a 2D book, the user can see the 3D virtual hand and can form similar gestures and learn some of the finer points. For example, a user can learn techniques such as precisely which angle to pick a guitar string by seeing the 3D virtual hand and 3D virtual guitar pick in a geo-registered fashion with the tangible guitar.

Figure 13B:
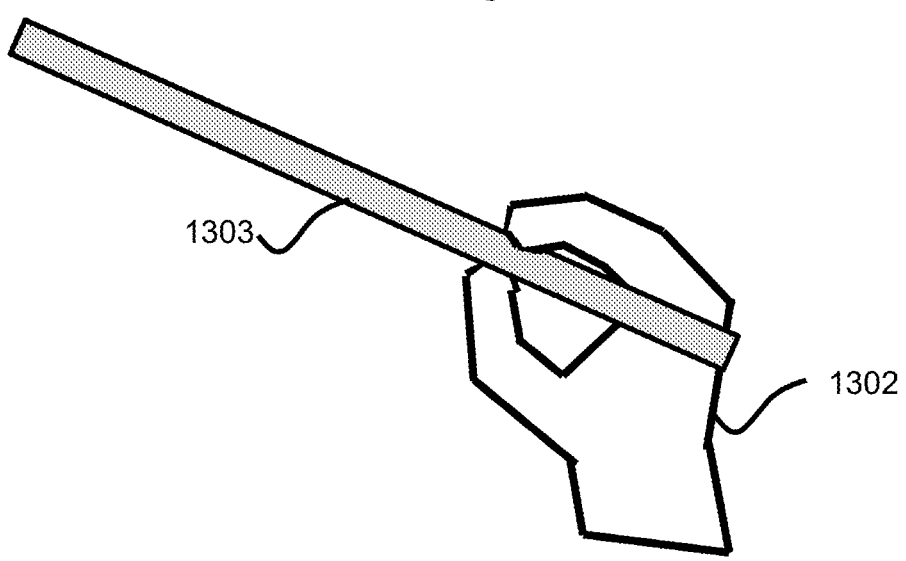
FIG. 13B illustrates a virtual hand holding a second virtual object.

FIG. 13B illustrates a virtual hand holding a second virtual object. 1302 illustrates a 3D virtual hand. 1303 illustrates a first virtual object, which is a virtual violin bow. In this example, the 3D virtual hand is registered to another 3D virtual object. This technology is useful because it improves teaching strategies. Rather than a user reading a book and mimicking a hand gesture in a 2D book, the user can see the 3D virtual hand and can form similar gestures and learn some of the finer points. for example, a user can learn techniques such as precisely which angle and rate to move a violin bow by seeing the 3D virtual hand and 3D virtual violin bow in a geo-registered fashion with the tangible violin. Precise techniques can be learned, which include, but are not limited to: finger grip; rates and angles of guitar strumming; and, angles of violin bow movement. This will overcome some of the difficulties that a user currently faces when trying to learn from a book.

Figure 14:
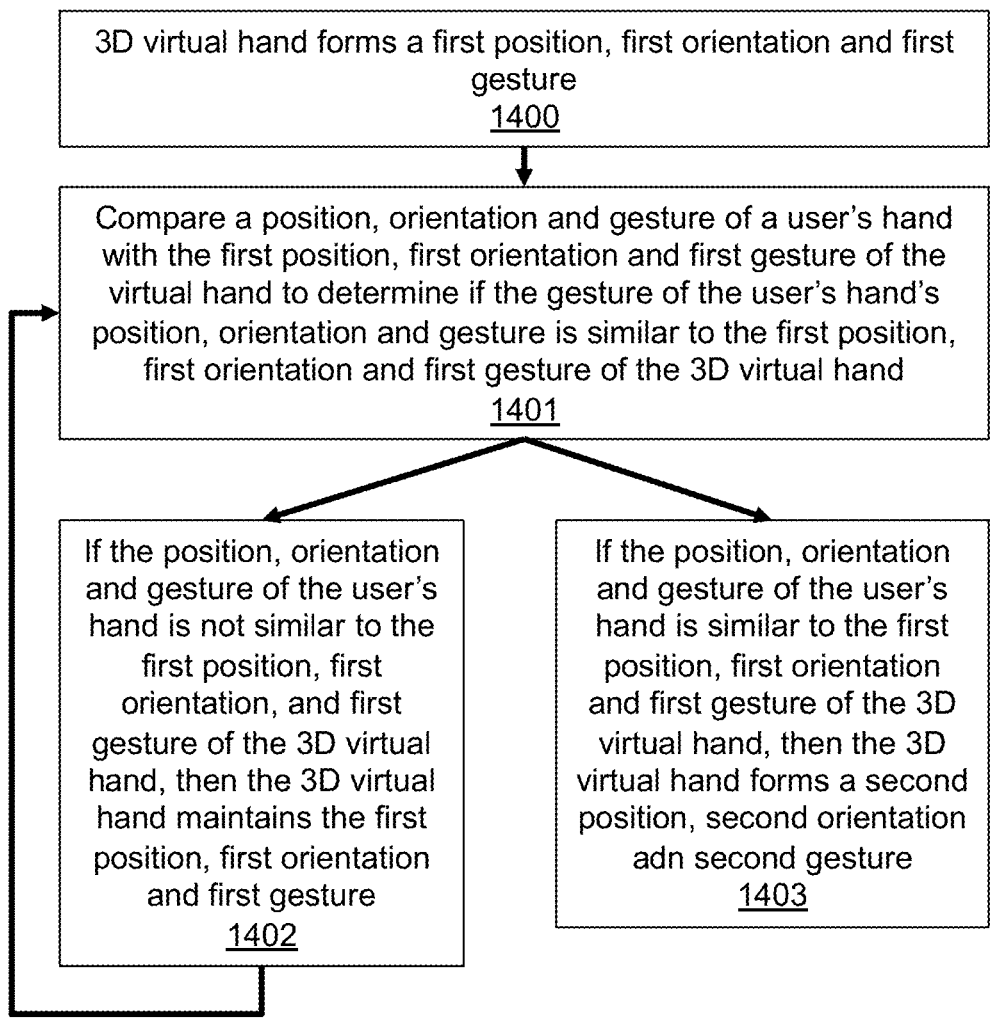
FIG. 14 illustrates an algorithm wherein a human hand acts as an input to cause the virtual object to perform the next programmed maneuver.

FIG. 14 illustrates an algorithm wherein a human hand acts as an input to cause the virtual object to perform the next programmed maneuver. 1400 illustrates a processing block comprising wherein a 3D virtual hand forms a first position, first orientation and first gesture. 1401 illustrates a processing block comprising comparing a position, orientation and gesture of a user's hand with the first position, first orientation and first gesture of the virtual hand to determine if the user's hand's position, orientation and gesture is similar to the first position, first orientation and first gesture of the 3D virtual hand. For example, the 3D virtual hand is making the gesture for the G chord on a guitar with the first position and first orientation with respect to the guitar. 1402 illustrates a processing block comprising wherein if the position, orientation and gesture of the user's hand is not similar to the first position, first orientation, and first gesture of the 3D virtual hand, then the 3D virtual hand maintains the first position, first orientation and first gesture. For example, if the user's hand gesture is on the A chord of the guitar (not matching the 3D virtual hand gesture on the G chord, then the 3D virtual hand would not move in its position. 1403 illustrates a processing block comprising wherein if the position, orientation and gesture of the user's hand is similar to the first position, first orientation and first gesture of the 3D virtual hand, then the 3D virtual hand forms a second position, second orientation and second gesture. For example, if the user's hand gesture moves to the G chord of the guitar and matches the 3D virtual hand gesture on the G chord of the guitar, then the 3D virtual hand forms a second gesture of the C chord.

Figure 15:
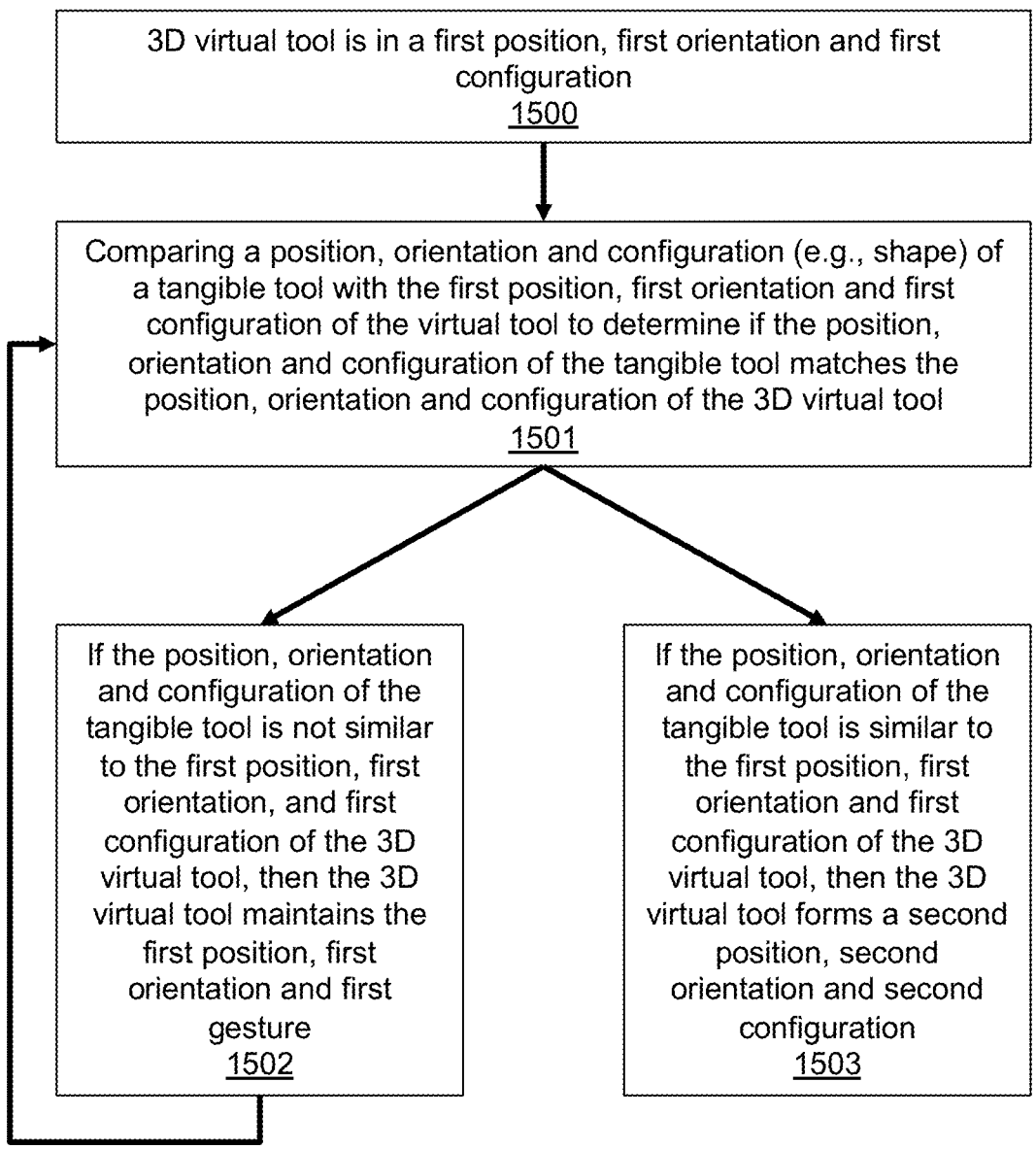
FIG. 15 illustrates an algorithm wherein a tangible tool acts as an input for the next 3D virtual object maneuver.

FIG. 15 illustrates an algorithm wherein a tangible tool acts as an input for the next 3D virtual object maneuver. 1500 illustrates a processing block comprising wherein a 3D virtual tool in in a first position, first orientation and first configuration. For example, a 3D virtual violin wand is geo-registered to a tangible violin and has a first position, first orientation and first configuration. Note is made the the 3D virtual hand is geo-registered to the 3D virtual tool. 1501 illustrates a processing block comprising comparing a position, orientation and configuration (e.g., shape) of a tangible tool with the first position, first orientation and first configuration of the virtual tool to determine if the position, orientation and configuration of the tangible tool matches the position, orientation and configuration of the 3D virtual tool. For example, the 3D virtual wand has a position, orientation and configuration such that it is manipulating the E string of the violin. 1502 illustrates a processing block comprising wherein if the position, orientation and configuration of the tangible tool is not similar to the first position, first orientation, and first configuration of the 3D virtual tool, then the 3D virtual tool maintains the first position, first orientation and first gesture. For example, if the tangible tool has a position, orientation and configuration such that it is manipulating the A string of the violin (not matching the 3D virtual wand, which is manipulating the E string of the violin), then the 3D virtual want would not move in its position. 1503 illustrates a processing block comprising wherein if the position, orientation and configuration of the tangible tool is similar to the first position, first orientation and first configuration of the 3D virtual tool, then the 3D virtual tool forms a second position, second orientation and second configuration. For example, if the tangible tool moves to the E string of the violin and matches the 3D virtual wand's position, orientation and configuration on the E string of the guitar, then the 3D virtual wand forms a second position, orientation and configuration on the G string of the violin.

Figure 16:
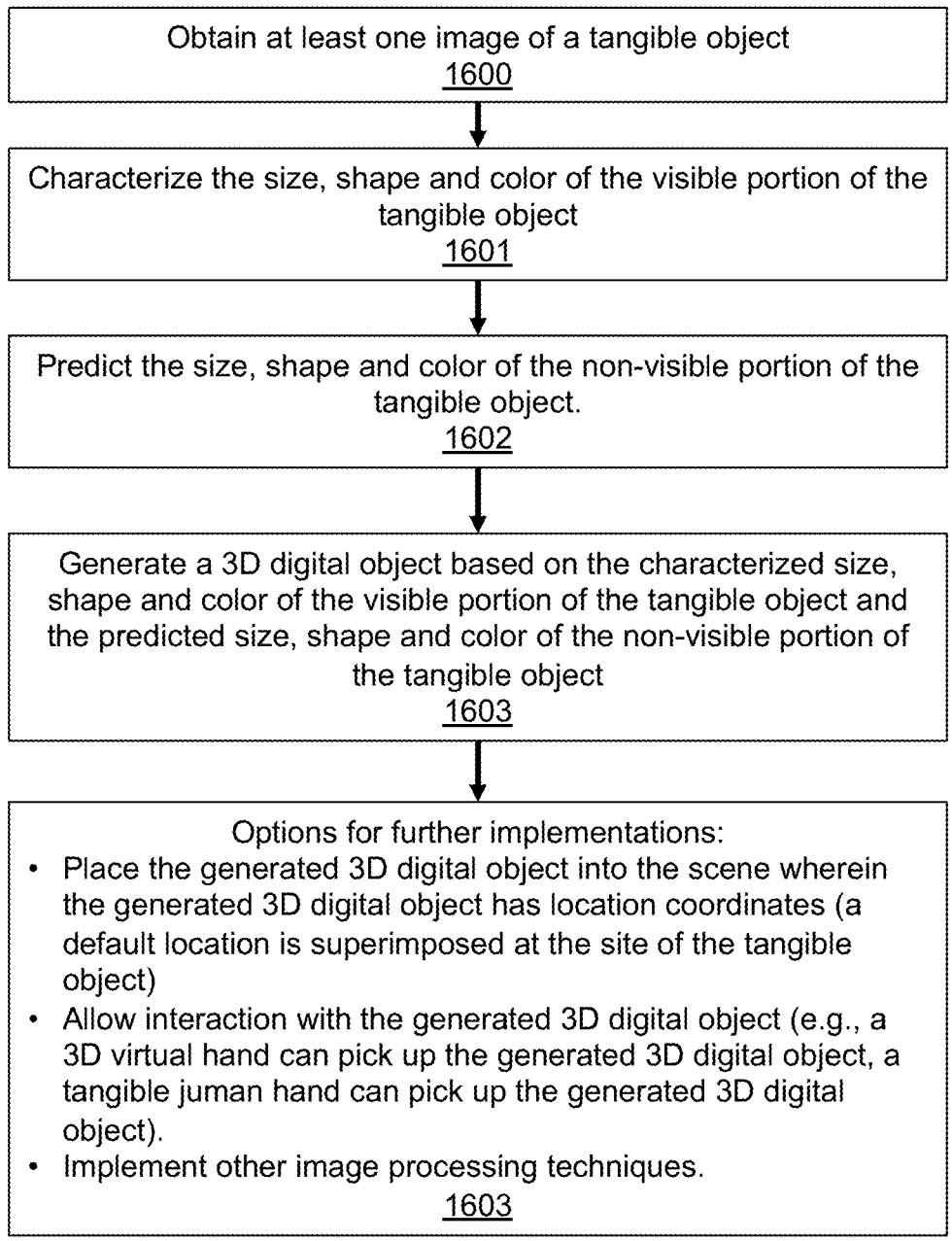
FIG. 16 illustrates a process for generating a virtual object from a tangible object.

FIG. 16 illustrates a process for generating a virtual object from a tangible object. 1600 illustrates a processing block comprising obtaining at least one image of a tangible object. This can be performed using a camera that acquires both a visible image and depth information in a scene. 1601 illustrates a processing block comprising characterize a size, a shape and a color of the visible portion of the tangible object. For example assume the tangible object is a remote control sitting on a table. A depth sensing camera in processing block 100 can be used to generate a portion of the surface geometry of the object so that some of the size and shape of the tangible object can be determined. A segmentation algorithm can be used to precisely determine where the boundary of the tangible object (e.g., remote control). A high-resolution visible camera can be used to determine the color of the object. 1602 illustrates a processing block comprising predicting the size, shape and color of the non-visible portion of the tangible object. A simple strategy is to generate a flat, monocolor back surface for the tangible object, such as is displayed in the subsequent figure. A more complex strategy is to use an artificial intelligence algorithm to match the object to a large database based on similarity from the visible portion of the tangible object. Then, pull either the whole 3D virtual object from the database or the non-visible portion of the 3D virtual object from the database. 1603 illustrates a processing block of generating a 3D digital object based on the characterized size, shape and color of the visible portion of the tangible object and the predicted size, shape and color of the non-visible portion of the tangible object. 1604 illustrates options for further implementations. A first example is to place the generated 3D digital object into the scene wherein the generated 3D digital object has location coordinates (a default location is superimposed at the site of the tangible object). A second example is to allow interaction with the generated 3D digital object (e.g., a 3D virtual hand can pick up the generated 3D digital object, a tangible juman hand can pick up the generated 3D digital object).

Figure 17A:
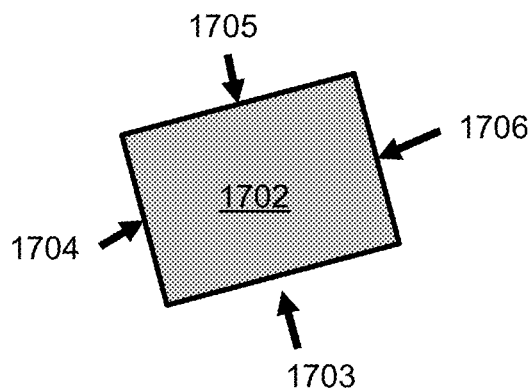
FIG. 17A illustrates a viewpoint, a viewing angle and a tangible object.

FIG. 17A illustrates a viewpoint, a viewing angle and a tangible object. 1700 illustrates the viewpoint. 1701 illustrates the viewing angle. 1702 illustrates the tangible object. 1703 illustrates a first tangible portion of the tangible object 1702, which is visible from viewpoint 1700. 1704 illustrates a second tangible portion of the tangible object 1702, which is visible from viewpoint 1700. 1705 illustrates a third tangible portion of the tangible object 1702, which is not visible from viewpoint 1700. 1706 illustrates a fourth tangible portion of the tangible object 1702, which is not visible from viewpoint 1700.

Figure 17B:
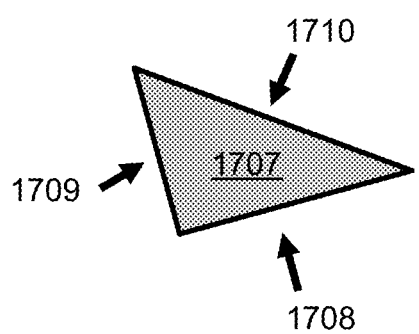
FIG. 17B illustrates a first virtual object, which is generated based on the tangible object in FIG. 1A.

FIG. 17B illustrates a first virtual object, which is generated based on the tangible object in FIG. 17A. A top down view is shown. 1707 illustrates the first virtual object, which is generated based on the tangible object in FIG. 17A. 1708 illustrates a first virtual portion of the first virtual object, which can be accurately reconstructed because it corresponds to the first tangible portion 1703 of the tangible object 1702, which is visible from viewpoint 1700. Note that this portion can be reconstructed. Tools used for reconstruction include a camera system, which can assess the surface geometry of the object and the visual appearance of the object. In addition, an image processing workstation can also be utilized, which can perform a segmentation algorithm to segment the object. 1709 illustrates a second virtual portion of the first virtual object, which can be accurately reconstructed because it corresponds to the second tangible portion 1704 of the tangible object 1702, which is visible from viewpoint 1700. Note that this portion can be reconstructed. Tools used for reconstruction include a camera system, which can assess the surface geometry of the object and the visual appearance of the object. In addition, an image processing workstation can also be utilized, which can perform a segmentation algorithm to segment the object. 1710 illustrates a third virtual portion of the first virtual object, which cannot be accurately reconstructed because it corresponds to the third tangible portion 1705 of the tangible object 1702 and the fourth tangible portion 1706 of the of the tangible object, which are not visible from viewpoint 1700. Note that this portion cannot be accurately reconstructed because it is not visible from the viewpoint 1700. Thus, a method to predict the size, shape and color of the non-visible portion of the tangible object can be implemented. The method shown in this example in FIG. 17B is to generate a plane to form the back surface of the virtual object 1707. Note that other example algorithms can use a range of geometric shapes and colors to denote predicted portions of the first virtual object.

Figure 17C:
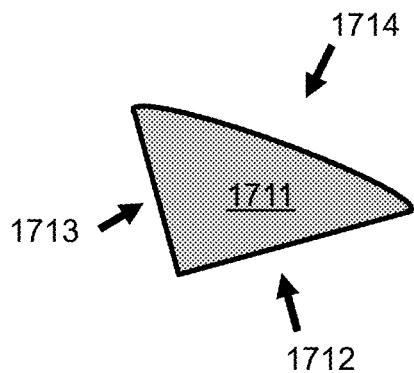
FIG. 17C illustrates a second virtual object, which is generated based on the tangible object in FIG. 1A.

FIG. 17C illustrates a second digital object, which is generated based on the tangible object in FIG. 17A. A top down view is shown. 1711 illustrates the second virtual object, which is generated based on the tangible object in FIG. 17A. 1712 illustrates a first virtual portion of the second virtual object, which can be accurately reconstructed because it corresponds to the first tangible portion 1703 of the tangible object 1702, which is visible from viewpoint 100. Note that this portion can be reconstructed. Tools used for reconstruction include a camera system, which can assess the surface geometry of the object and the visual appearance of the object. In addition, an image processing workstation can also be utilized, which can perform a segmentation algorithm to segment the object. 1713 illustrates a second virtual portion of the second virtual object, which can be accurately reconstructed because it corresponds to the second tangible portion 1704 of the tangible object 1702, which is visible from viewpoint 1700. Note that this portion can be reconstructed. Tools used for reconstruction include a camera system, which can assess the surface geometry of the object and the visual appearance of the object. In addition, an image processing workstation can also be utilized, which can perform a segmentation algorithm to segment the object. 1714 illustrates a third virtual portion of the second virtual object, which cannot be accurately reconstructed because it corresponds to the third tangible portion 1705 of the tangible object 1702 and the fourth tangible portion 1706 of the of the tangible object, which are not visible from viewpoint 1700. Note that this portion cannot be accurately reconstructed because it is not visible from the viewpoint 1700. Thus, a method to predict the size, shape and color of the non-visible portion of the tangible object can be implemented. The method shown in this example in FIG. 17B is to generate a curved surface to form the back surface of the virtual object 1707. Note that other example algorithms can use a range of geometric shapes and colors to denote predicted portions of the first virtual object. Additionally, if the object can be recognized (e.g., via an AI algorithm), then it is possible to load a virtual object that corresponds to the predicted object. Note that a key step is the generation of database of virtual objects, which have all surfaces created.

Figure 17D:
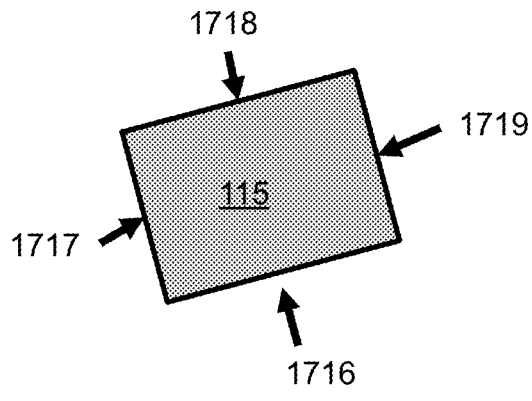
FIG. 17D illustrates a third virtual object, which is generated based on the tangible object in FIG. 1A.

FIG. 17D illustrates a third virtual object, which is generated based on the tangible object in FIG. 17A. A top down view is shown. 1715 illustrates the third virtual object, which is generated based on the tangible object in FIG. 17A. 1716 illustrates a first virtual portion of the third virtual object, which can be accurately reconstructed because it corresponds to the first tangible portion 1703 of the tangible object 1702, which is visible from viewpoint 1700. Note that this portion can be reconstructed. Tools used for reconstruction include a camera system, which can assess the surface geometry of the object and the visual appearance of the object. In addition, an image processing workstation can also be utilized, which can perform a segmentation algorithm to segment the object. 1717 illustrates a second virtual portion of the third virtual object, which can be accurately reconstructed because it corresponds to the second tangible portion 1704 of the tangible object 1702, which is visible from viewpoint 1700. Note that this portion can be reconstructed. Tools used for reconstruction include a camera system, which can assess the surface geometry of the object and the visual appearance of the object. In addition, an image processing workstation can also be utilized, which can perform a segmentation algorithm to segment the object. 1718 illustrates a third virtual portion of the third virtual object, which cannot be accurately reconstructed because it corresponds to the third tangible portion 1705 of the tangible object 1702, which are not visible from viewpoint 1700. Note that this portion cannot be accurately reconstructed because it is not visible from the viewpoint 1700. Thus, a method to predict the size, shape and color of the non-visible portion of the tangible object can be implemented. The method shown in this example in FIG. 17D is to analyze the visible surfaces to try and characterize the object. Once characterized, the virtual object can be loaded (e.g., downloaded from a server containing a list of virtual objects). Note that a key step is the generation of database of virtual objects, which have all surfaces created. 1719 illustrates a fourth virtual portion of the third virtual object, which cannot be accurately reconstructed because it corresponds to the fourth tangible portion 1706 of the of the tangible object, which are not visible from viewpoint 1700. Note that this portion cannot be accurately reconstructed because it is not visible from the viewpoint 1700. Thus, a method to predict the size, shape and color of the non-visible portion of the tangible object can be implemented. The method shown in this example in FIG. 17D is to analyze the visible surfaces to try and characterize the object. Once characterized, the virtual object can be loaded (e.g., downloaded from a server containing a list of virtual objects). Note that a key step is the generation of database of virtual objects, which have all surfaces created (and, if desired, the internal architecture of the object, such as in a voxelated dataset).

Figure 18:
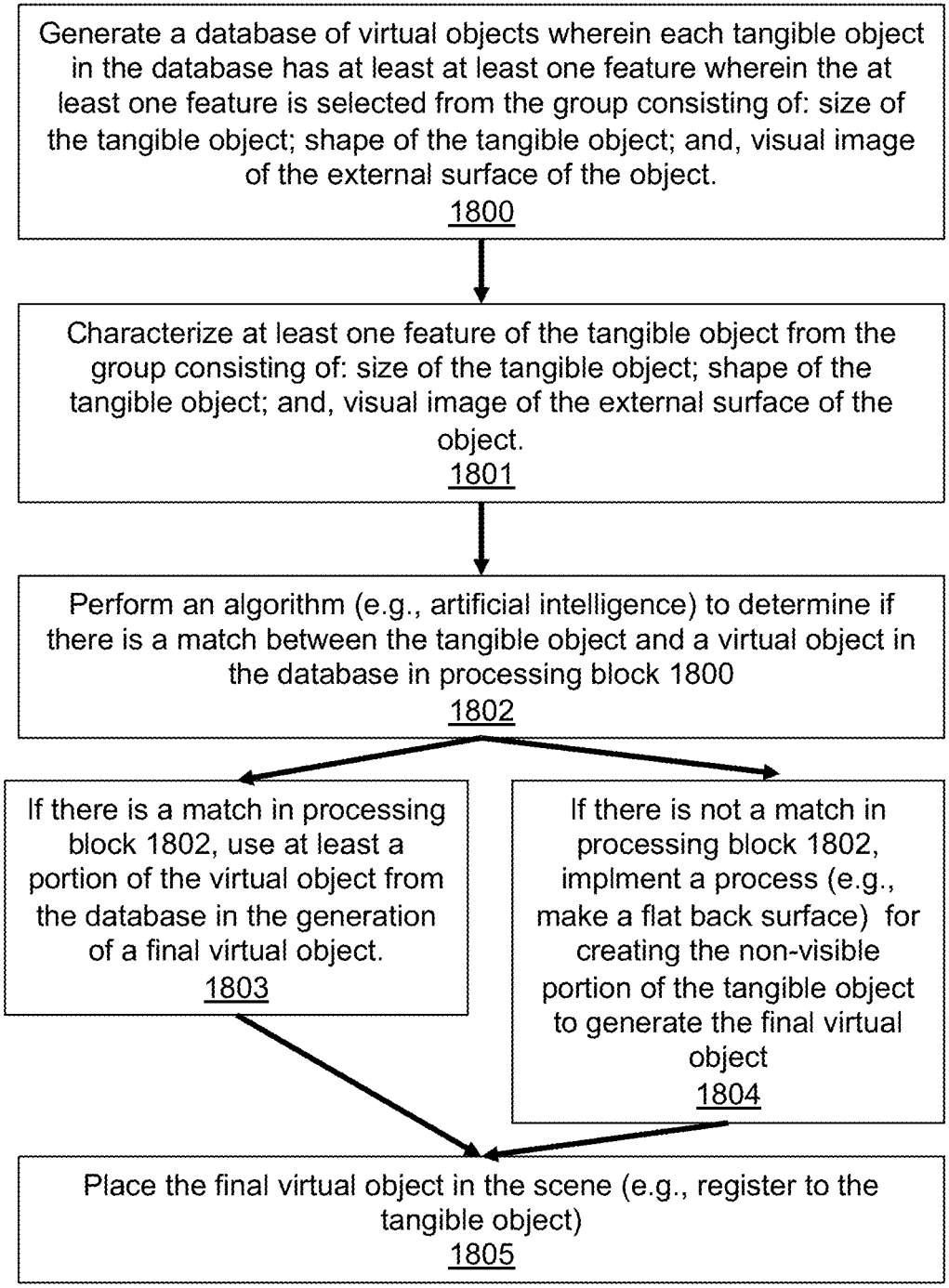
FIG. 18 illustrates predicting the size, shape and color of the non-visible portion of the tangible object.

FIG. 18 illustrates predicting the size, shape and odor of the non-visible portion of the tangible object. Processing block 1800 illustrates generating a database of virtual objects wherein each tangible object in the database has at least at least one feature wherein the at least one feature is selected from the group consisting of: size of the tangible object; shape of the tangible object; and, visual image of the external surface of the object. Processing block 1801 illustrates characterizing at least one feature of the tangible object from the group consisting of: size of the tangible object; shape of the tangible object; and, visual image of the external surface of the object. Processing block 1802 illustrates performing an algorithm (e.g., artificial intelligence) to determine if there is a match between the tangible object and a virtual object in the database in processing block 1800. Processing block 1803 illustrates wherein If there is a match in processing block 1802, use at least a portion of the virtual object from the database in the generation of a final virtual object. Processing block 1804 illustrates wherein if there is not a match in processing block 1802, implement a process (e.g., make a flat back surface) for creating the non-visible portion of the tangible object to generate the final virtual object. Processing block 1805 illustrates placing the final virtual object in the scene (e.g., register to the tangible object).

Figure 19:
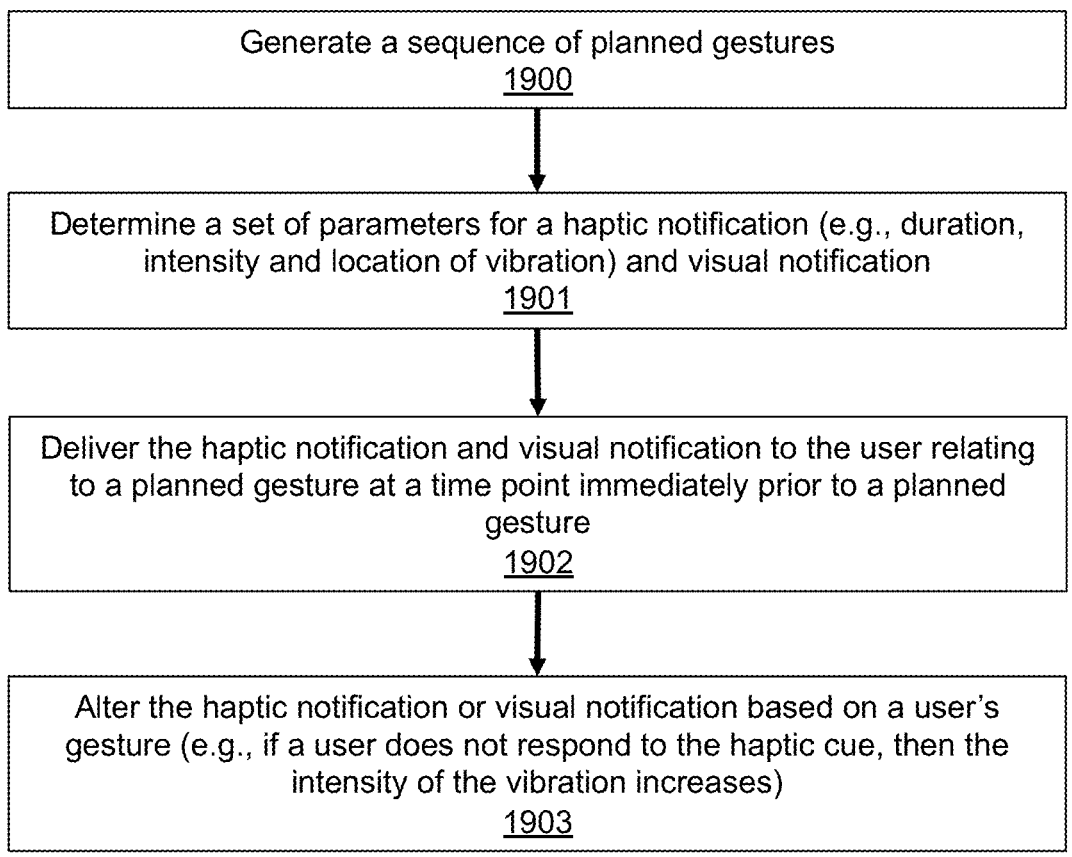
FIG. 19 illustrates a method and process for providing haptic cues prior to a planned gesture.

FIG. 19 illustrates providing haptic cues prior to a planned gesture. Processing block 1900 illustrates generating a sequence of planned gestures. Processing block 1901 illustrates determine a set of parameters for a haptic notification (e.g., duration, intensity and location of vibration) and visible notification (e.g., change the visual appearance of the 3D virtual hand). There are a range of haptic gloves available on the market. For example, see https://www.manus-vr.com/prime-2-haptic. Processing block 1902 illustrates delivering the haptic notification to the user relating to a planned gesture at a time point immediately prior to a planned gesture. The timing of how long before a planned gesture should the haptic cue and the visible cue be determined by user preference. For example, a 1 second early warning notice can be performed or a 2 second early warning notice can be performed. Processing block 1903 illustrates altering the haptic notification based on a user's gesture (e.g., if a user does not respond to the haptic cue, then the intensity of the vibration increases). Also, an example of the visual notification being altered would be from a finger of the 3D virtual hand turning from a black dotted appearance to a red flashing appearance.

FIG. 20 illustrates the delivery of the haptic cue and the visible cue to a user. This chart shows four columns. The first column shows time points. The second column shows the registration point and 3D virtual hand gesture. The third column shows the haptic cue delivered via a glove. The fourth column shows the visible cue delivered via the 3D virtual hand. At the first time point, the 3D virtual hand is forming a gesture wherein the index finger is positioned over a hole on a recorder. 2000 illustrates an human hand in a glove. 2001 illustrates a tangible recorder musical instrument. 2002 illustrates a spot on the glove wherein a haptic cue is delivered on the middle finger to alert the user that the next move involves the middle finger. Also, at the first time point, the 3D virtual hand 103 is shown with solid black line outline. 2004 illustrates a dotted appearance of the middle finger, which is visual cue delivered via the 3D virtual hand. Other types of changes to the 3D virtual hand can also be performed, such as color changes. Other visual cues external to the 3D virtual hand can also be performed, such as a visible marker near the next key, which is to be played. At the second time point, the 3D virtual hand forms a gesture with the index finger positioned over a different hole on the recorder. A haptic cue at time point 2 is programmed to alert the user for an upcoming gesture at time point 3. A visible cue at time point 2 is also programmed to alert the user for an upcoming gesture at time point 3.

Figures 21A, 21B:
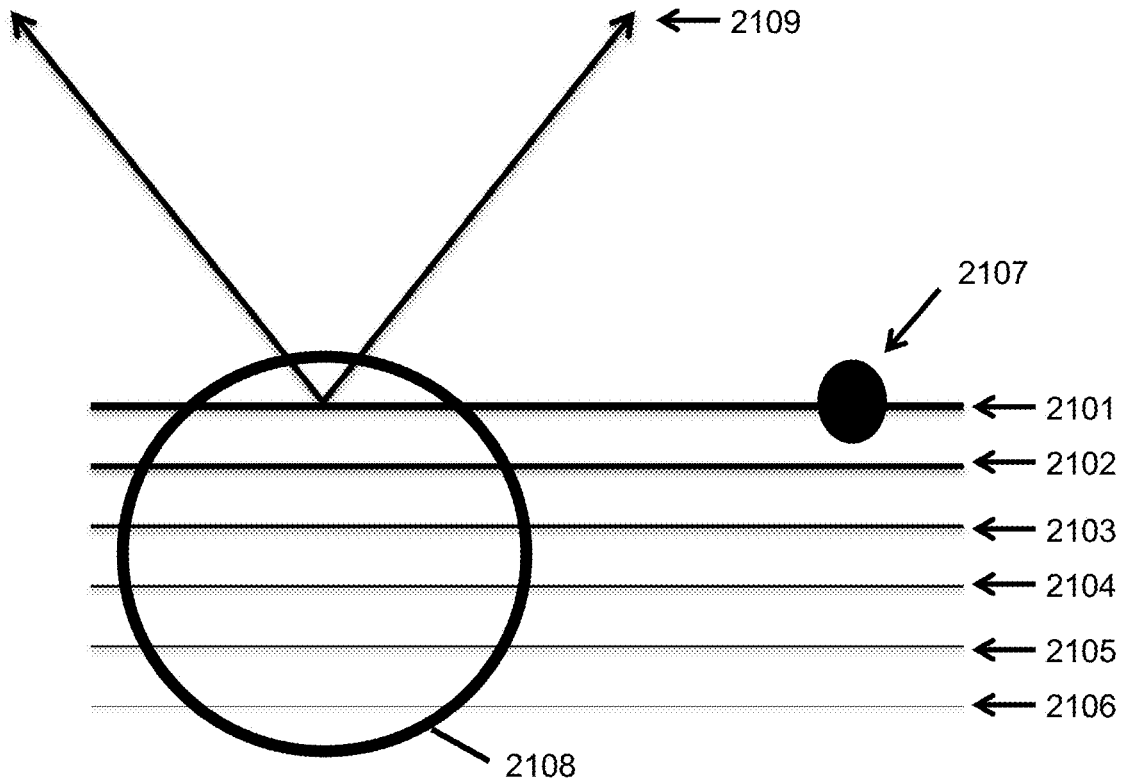
FIG. 21A illustrates techniques to optimize learning a musical instrument.
FIG. 21B illustrates examples of visual cues and visual feedback to improve learning of a musical instrument.

FIG. 21A illustrates techniques to optimize learning a musical instrument. 2100 illustrates a table, which shows the addition of cues and feedback to enhance learning. Two types of cues are added including: visual cues via an extended reality headset; and haptic cues via a glove. Visual cues include: a 3D virtual hand; and, a digital object. In the preferred embodiment, these visual cues are displayed on a HDU. These visual cues are delivered to a user just prior to a note. Haptic signal include vibration signals delivered via a glove. These haptic cues are delivered to a user just prior to a note. Additionally, there are two types of feedback provided. For example, the feedback can be delivered to notify if correct or incorrect note. With respect to visual feedback, a sound-type visualization feature can be displayed. In addition, a haptic notification can also be displayed.

FIG. 21B illustrates examples of visual cues and visual feedback to improve learning of a musical instrument. 2101 illustrates a first guitar string. 2102 illustrates a second guitar string. 2103 illustrates a third guitar string. 2104 illustrates a fourth guitar string. 2105 illustrates a fifth guitar string. 2106 illustrates a sixth guitar string. 2107 illustrates a digital object as a visual cue signaling to the user of the next string to pluck. 2108 illustrates the hole in the guitar. 2109 illustrates a sound-type visualization feature, which can be used as visual feedback.

Figure 22A:
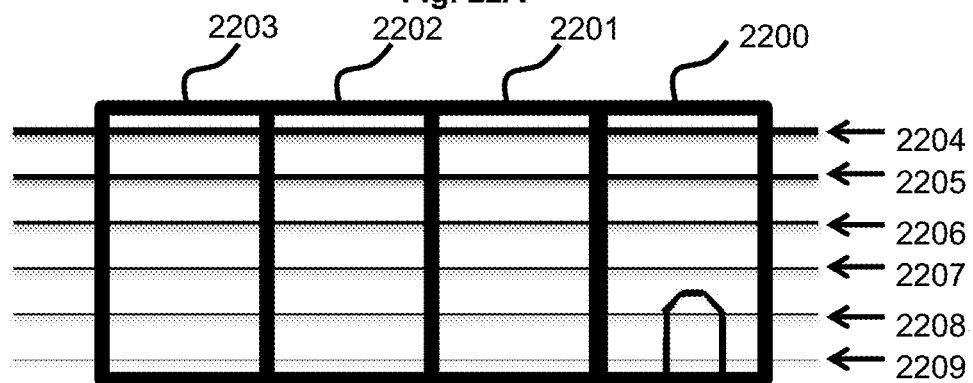
FIG. 22A illustrates the 3D virtual hand teaching a user to play the C note.

FIG. 22A illustrates the 3D virtual hand teaching a user to play the C note. 2200 illustrates a first fret on a guitar. 2201 illustrates a second fret on the guitar. 2202 illustrates a third fret on the guitar. 2203 illustrates a fourth fret on the guitar. 2204 illustrates an E string of the guitar. 2205 illustrates an A string of the guitar. 2206 illustrates a D string of the guitar. 2207 illustrates a G string of the guitar. 2208 illustrates a B string of the guitar. 2209 illustrates an E string of the guitar. 2210 illustrates the 3D virtual hand. The pad of the index finger of the virtual hand 110 is positioned on the first fret of the B string 108, which corresponds to the "C" note.

Figure 22B:
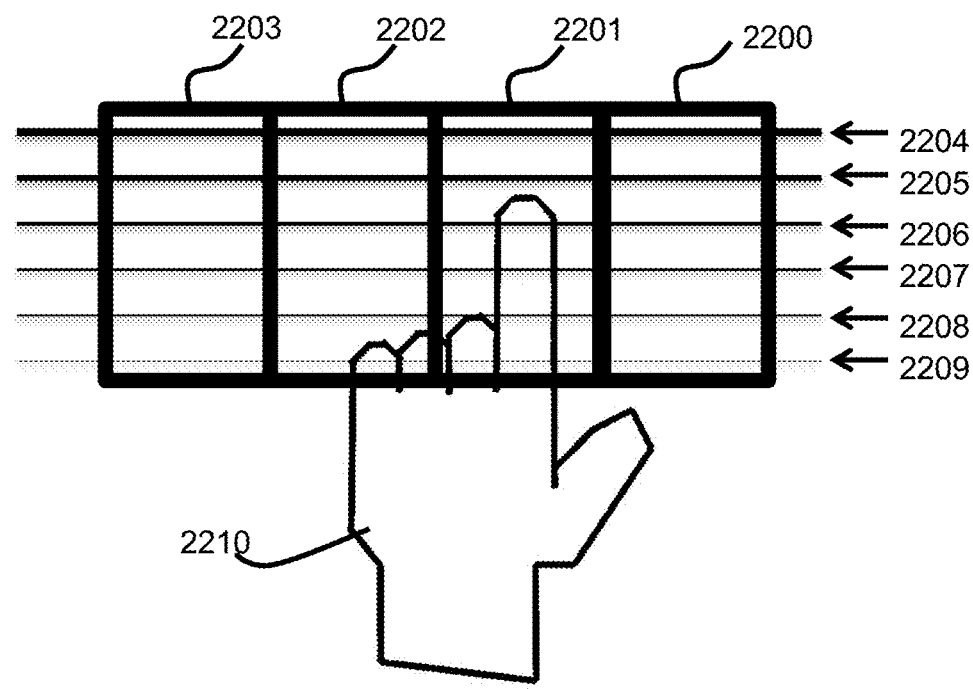
FIG. 22B illustrates the virtual hand teaching a user to play the E note.

FIG. 22B illustrates the virtual hand teaching a user to play the E note. 2200 illustrates a first fret on a guitar. 2201 illustrates a second fret on the guitar. 2202 illustrates a third fret on the guitar. 2203 illustrates a fourth fret on the guitar. 2204 illustrates an E string of the guitar. 2205 illustrates an A string of the guitar. 2206 illustrates a D string of the guitar. 2207 illustrates a G string of the guitar. 2208 illustrates a B string of the guitar. 2209 illustrates an E string of the guitar. 2210 illustrates the 3D virtual hand. The pad of the index finger of the virtual hand 110 is positioned on the second fret of the D string, which corresponds to the "E" note. In this example, the 3D virtual hand did not change in its gesture. Rather, it only moved in location to a different fret and string.

FIG. 23 illustrates generating a set of 3D virtual objects through scene sensing cameras. This example describes generating a set of 3D virtual hands to mimic another user's hands. Processing block 2300 illustrates determining (e.g., by using a scene sensing camera) the 3D shape of a first tangible object (e.g., a human hand of a first user), the 3D shape of a second tangible object (e.g., a classified musical instrument), the relative position of the first tangible object with respect to the second tangible object, and the relative orientation of the first tangible object with respect to the second tangible object at at least one time point. Processing block 2301 illustrates storing the 3D shape of the first tangible object as a first virtual object (e.g., 3D virtual hand gesture), the 3D shape of a second object as a second virtual object (e.g., 3D virtual recorder), the relative position of the first tangible object with respect to the second tangible object, and the relative orientation of the first tangible object with respect to the second tangible object (e.g., with respect to registration points) into a memory (e.g., non-transitory computer readable medium) at the least one time point. Processing block 2303 illustrates registering the at least one time point the second virtual object (e.g., 3D virtual recorder) with a matched tangible object (e.g., tangible recorder). Processing block 2303 illustrates registering at the least one time point the the first virtual object (e.g., 3D virtual hand) on the matched tangible object (e.g., classified musical recorder) wherein: the relative position of the first object with respect to the second object matches the relative position of the first virtual object with respect to the matched tangible object; and the relative orientation of the first object with respect to the second object matches the relative orientation of the first virtual object with respect to the matched tangible object. Processing block 2304 illustrates displaying the registered first virtual object on the matched tangible object to a user wearing a head display unit at the least one time point. This process can be used for a variety of applications. For example, one can register an expert musician's hand movements onto their own musical instrument and view it via the 3D virtual hand process. Additionally, this process can be used to register those movements onto an object other than a musical instrument. Other gestures can be performed, such as shaking hands.

FIG. 24 illustrates example applications of the geo-registered 3D virtual hand. There are a range of applications. For example, in medicine, the 3D virtual hand can be used to teach surgical procedures by teaching the surgeon how to properly hold and position instrumentation. In interventional radiology, the 3D virtual hand can teach the radiologist how to hold a catheter. In occupational therapy, the 3D virtual hand can teach a patient how to do activities of daily living, such as how to grab a cup or how to write with a pencil. In sports, the 3D virtual hand can help guide the user into how to grip a golf club or other racket sports. In music, the 3D virtual hand can be used to teach a user how to play a song. In machinary, the 3D virtual hand can be used to improve safety by directing a users hands onto the proper locations on a tool. In art, the 3D virtual hand can hold a 3D virtual paintbrush and teach a user how to paint a Monet replica. Other miscellaneous household tasks can also be accomplished via the virtual hand including instruction of table manners of how to properly hold a fork and knife.

Throughout the entirety of the present disclosure, use of the articles "a" or "an' to modify a noun may be understood to be used for convenience and to include one, or more than one of the modified noun, unless otherwise specifically stated. Elements, components, modules, and/or parts thereof that are described and/or otherwise portrayed through the figures to communicate with, be associated with, and/or be based on, Something else, may be understood to so communicate, be associated with, and or be based on in a direct and/or indirect manner, unless otherwise stipulated herein. The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation. References to "a microprocessor and "a processor, or "the microprocessor and "the processor." may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor or "processor terminology may thus also be understood to include a central processing unit, an arithmetic logic unit, an application-specific integrated circuit (IC), and/or a task engine, with such examples provided for illustration and not limitation. Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where Such memory may be contiguous and/or partitioned based on the application. Accordingly, references to a database may be understood to include one or more memory associations, where such references may include commercially available database products (e.g., SQL, Informix, Oracle) and also include proprietary databases, and may also include other structures for associating memory Such as links, queues, graphs, trees, with such structures provided for illustration and not limitation. References to a network, unless provided otherwise, may include one or more intranets and/or the Internet, as well as a virtual network. References hereinto microprocessor instructions or microprocessor-executable instructions, in accordance with the above, may be understood to include programmable hardware.

Unless otherwise stated, use of the word "substantially' may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" or "an' to modify a noun may be understood to be used for convenience and to include one, or more than one of the modified noun, unless otherwise specifically stated. Elements, components, modules, and/or parts thereof that are described and/or otherwise portrayed through the figures to communicate with, be associated with, and/or be based on, Something else, may be understood to so communicate, be associated with, and or be based on in a direct and/or indirect manner, unless otherwise stipulated herein. Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art. Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

Several features, aspects, embodiments and implementations have been described. Nevertheless, it will be understood that a wide variety of modifications and combinations may be made without departing from the scope of the inventive concepts described herein. Accordingly, those modifications and combinations are within the scope of the following claims.

What is claimed is:

1. A method comprising:
   assigning at least two registration points to a tangible object,
     wherein said tangible object has a first registration point,
     wherein said first registration point is at a first location on said tangible object,
     wherein said tangible object has a second registration point,
     wherein said second registration point is at a second location on said tangible object,
     wherein said first location is different from said second location,
   performing registration of a 3D virtual hand to said tangible object
     wherein the 3D virtual hand has location coordinates in physical space,
     wherein a change in the tangible object's position causes a corresponding change in the 3D virtual hand's position, and
     wherein a change in the tangible object's orientation causes a corresponding change in the 3D virtual hand's orientation;

tracking the tangible object's position and orientation;
determining a change in the 3D virtual hand's position and orientation, which correspond to a change in the tangible object's position and orientation; and
at a first time point, displaying the 3D virtual hand in a head display unit (HDU)
wherein the 3D virtual hand forms a first gesture, a first position and a first orientation on the tangible object, and
wherein a fingertip of said 3D virtual hand is located in proximity to said first registration point;
generating a changed 3D virtual hand
wherein said generating said changed 3D virtual hand comprises wherein said fingertip of said 3D virtual hand is located in proximity to said second registration point and at least one of the group consisting of:
forming, by the 3D virtual hand, a second gesture wherein said second gesture is different from said first gesture;
forming, by the 3D virtual hand, a second position on said tangible object wherein said second position is different from said first position; and
forming, by the 3D virtual hand, a second orientation on said tangible object wherein said second orientation is different from said first orientation; and
at a subsequent time point, displaying the changed virtual 3D hand in the HDU.

2. The method of claim 1 further comprising wherein the tangible object is a musical instrument.

3. The method of claim 2 further comprising wherein the changed 3D virtual hand teaches a note by performing at least one of the group consisting of:
performing a gesture on the musical instrument;
moving in position on the musical instrument; and
altering in orientation on the musical instrument.

4. The method of claim 2 further comprising displaying a sound-type visualization feature.

5. The method of claim 1 further comprising wherein the 3D virtual hand maintains a gesture until a human hand matches the gesture.

6. The method of claim 1 further comprising generating a sequence of gestures for the 3D virtual hand on the tangible object wherein the set of registration points are used to determine a set of movements of the 3D virtual hand.

7. The method of claim 1 further comprising:
using a camera to determine a shape, a size and an appearance of a second tangible object in the scene; and
generating a 3D virtual object based on the second tangible object.

8. The method of claim 1 further comprising performing registration of a 3D virtual object to the 3D virtual hand wherein the 3D virtual object has location coordinates in physical space wherein a change in the second 3D virtual hand's position causes a corresponding change in the 3D virtual object's position and wherein a change in the virtual hand's orientation causes a corresponding change in the 3D virtual object's orientation.

9. The method of claim 1 further comprising performing registration of a 3D virtual object to a human hand wherein a change in the human hand's position causes a corresponding change in the 3D virtual object's position and wherein a change in the human hand's orientation causes a corresponding change in the 3D virtual object's orientation.

10. The method of claim 1 further comprising wherein the changed 3D virtual hand forms a gesture by performing at least one of the group consisting of:
flexing at least one finger;
extending at least one finger;
adducting at least one finger; and
abducting at least one finger.

11. The method of claim 1 further comprising wherein the changed 3D virtual hand gets a user's attention.

12. The method of claim 1 further comprising providing a visual cue for a subsequent planned gesture on the HDU.

13. The method of claim 1 further comprising providing a haptic cue for a subsequent planned gesture via a glove.

14. A non-transitory computer storage medium having computer-executable instructions which, when executed by a computing device, cause the computing device to perform the operations of:
using at least two registration points to a tangible object,
wherein said tangible object has a first registration point,
wherein said first registration point is at a first location on said tangible object,
wherein said tangible object has a second registration point,
wherein said second registration point is at a second location on said tangible object,
wherein said first location is different from said second location,
performing registration of a 3D virtual hand to said tangible object
wherein the 3D virtual hand has location coordinates in physical space,
wherein a change in the tangible object's position causes a corresponding change in the 3D virtual hand's position, and
wherein a change in the tangible object's orientation causes a corresponding change in the 3D virtual hand's orientation;
tracking the tangible object's position and orientation;
determining a change in the 3D virtual hand's position and orientation, which correspond to a change in the tangible object's position and orientation; and
at a first time point, sending the 3D virtual hand to a head display unit (HDU) for display
wherein the 3D virtual hand forms a first gesture, a first position and a first orientation on the tangible object, and
wherein a fingertip of said 3D virtual hand is located in proximity to said first registration point;
generating a changed 3D virtual hand
wherein said generating said changed 3D virtual hand comprises wherein said fingertip of said 3D virtual hand is located in proximity to said second registration point and at least one of the group consisting of:
forming, by the 3D virtual hand, a second gesture wherein said second gesture is different from said first gesture;
forming, by the 3D virtual hand, a second position on said tangible object wherein said second position is different from said first position; and
forming, by the 3D virtual hand, a second orientation on said tangible object wherein said second orientation is different from said first orientation; and
at a subsequent time point, sending the changed virtual 3D hand to the HDU for display.

15. A display unit, comprising:

a processor;

a left eye display;

a right eye display;

a non-transitory memory having computer-executable instructions stored thereupon, which when executed by the processor cause the display unit to perform the operations of:

using at least two registration points to a tangible object, wherein said tangible object has a first registration point, wherein said first registration point is at a first location on said tangible object, wherein said tangible object has a second registration point, wherein said second registration point is at a second location on said tangible object, wherein said first location is different from said second location, performing registration of a 3D virtual hand to said tangible object wherein the 3D virtual hand has location coordinates in physical space, wherein a change in the tangible object's position causes a corresponding change in the 3D virtual hand's position, and wherein a change in the tangible object's orientation causes a corresponding change in the 3D virtual hand's orientation;

tracking the tangible object's position and orientation;

determining a change in the 3D virtual hand's position and orientation, which correspond to a change in the tangible object's position and orientation; and at a first time point, displaying the 3D virtual hand in said display unit wherein the 3D virtual hand forms a first gesture, a first position and a first orientation on the tangible object, and wherein a fingertip of said 3D virtual hand is located at said first registration point;

generating a changed 3D virtual hand wherein said generating said changed 3D virtual hand comprises wherein said fingertip of said 3D virtual hand is located at said second registration point and at least one of the group consisting of:

forming, by the 3D virtual hand, a second gesture wherein said second gesture is different from said first gesture;

forming, by the 3D virtual hand, a second position on said tangible object wherein said second position is different from said first position; and forming, by the 3D virtual hand, a second orientation on said tangible object wherein said second orientation is different from said first orientation; and at a subsequent time point, displaying the changed virtual 3D hand in the display unit.

* * * * *